(12) United States Patent
Kelecy et al.

(10) Patent No.: US 6,856,063 B1
(45) Date of Patent: Feb. 15, 2005

(54) ELECTROMOTIVE DEVICES USING NOTCHED RIBBON WINDINGS

(75) Inventors: Patrick Kelecy, Floyds Knobs, IN (US); Paul Receveur, New Albany, IN (US)

(73) Assignee: Magnetic Power-Motion, LLC, Floyds Knobs, IN (US)

( * ) Notice: Subject to any disclaimer, the term of this patent is extended or adjusted under 35 U.S.C. 154(b) by 0 days.

(21) Appl. No.: 10/857,410

(22) Filed: May 28, 2004

Related U.S. Application Data

(62) Division of application No. 10/601,977, filed on Jun. 23, 2003, now Pat. No. 6,768,239.

(51) Int. Cl.[7] .................................................. H02K 1/00
(52) U.S. Cl. ........................ 310/179; 310/184; 310/203; 310/206; 29/596; 29/598
(58) Field of Search ................................ 310/179, 184, 310/201–208; 29/596–598

(56) References Cited

U.S. PATENT DOCUMENTS

| | | | |
|---|---|---|---|
| 3,401,287 A | * | 9/1968 | French et al. ............... 310/168 |
| 4,319,152 A | | 3/1982 | Van Gils |
| 4,398,112 A | * | 8/1983 | van Gils .................... 310/201 |
| 5,422,526 A | | 6/1995 | Kawabata et al. |
| 5,616,977 A | | 4/1997 | Hill |
| 5,744,896 A | | 4/1998 | Kessinger, Jr. et al. |
| 5,834,875 A | | 11/1998 | Hill |
| 5,942,830 A | | 8/1999 | Hill |
| 5,955,808 A | | 9/1999 | Hill |
| 6,140,734 A | | 10/2000 | Hazelton et al. |
| 6,281,614 B1 | | 8/2001 | Hill |
| 6,348,751 B1 | | 2/2002 | Jermakian et al. |
| 6,373,164 B1 | | 4/2002 | Nishimura |
| 2002/0079775 A1 | | 6/2002 | Janssen et al. |

FOREIGN PATENT DOCUMENTS

JP   0051447   3/1985

* cited by examiner

*Primary Examiner*—Thanh Lam
(74) *Attorney, Agent, or Firm*—Camoriano and Associates; Theresa Fritz Camoriano; Guillermo Camoriano

(57) ABSTRACT

A multiple phase winding for an electromotive device comprised of individual phase windings. Each phase winding includes multiple layers of conductors and defines working length portions and interior and exterior end-turn portions, wherein at least one set of end-turn portions defines notches which cut across the height dimension of all the layers of conductors. The notches of different phases intermesh. This geometry promotes low electrical resistance within the phase windings and good conductive heat transfer between the multiple phase winding and the housing of the electromotive device, allowing higher power density from the device.

6 Claims, 36 Drawing Sheets

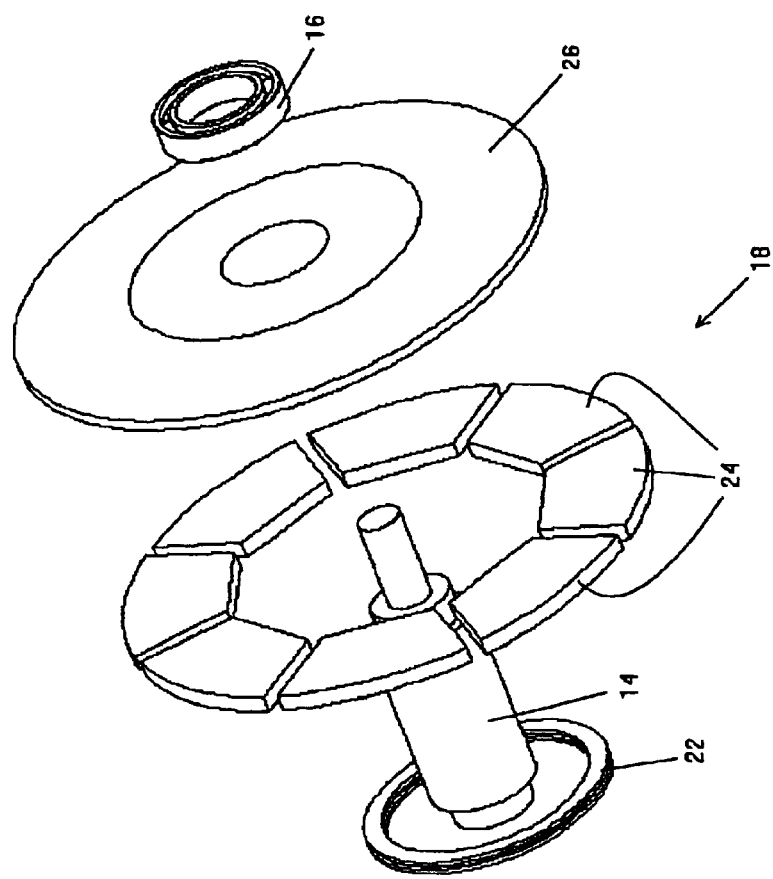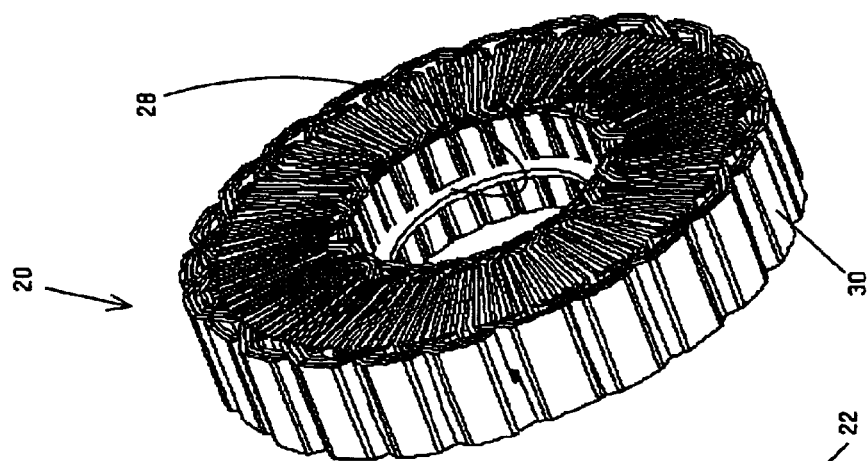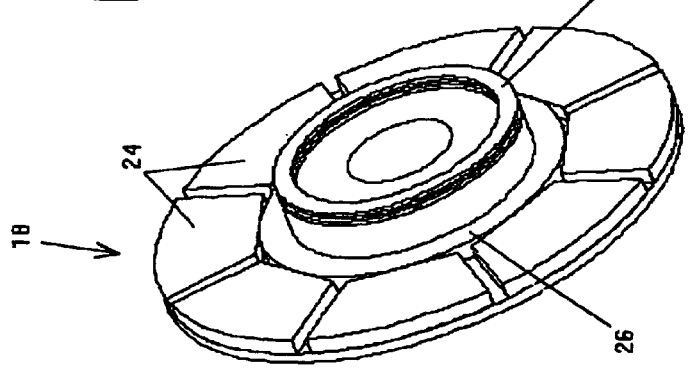
FIGURE 3

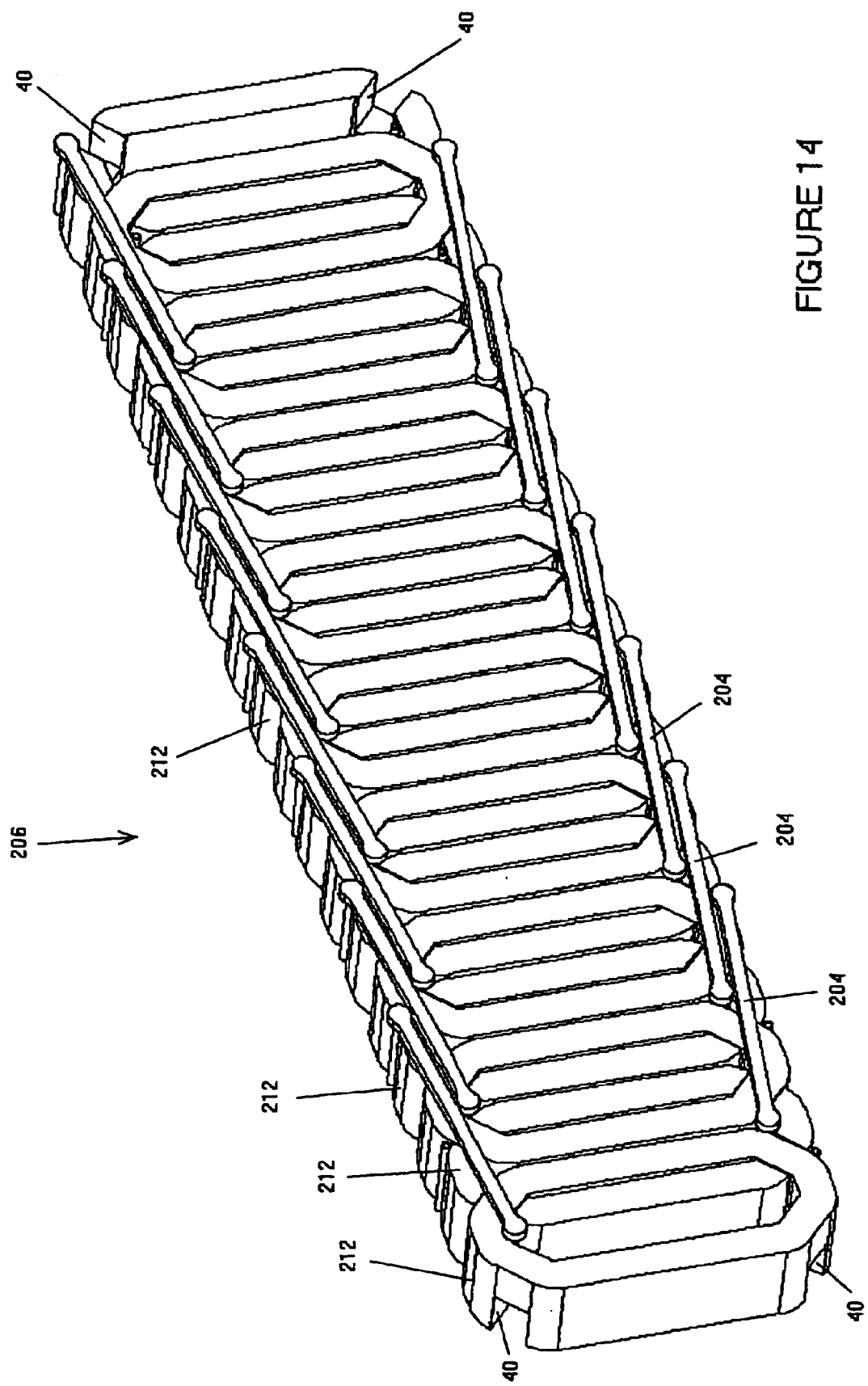

ELECTROMOTIVE DEVICES USING NOTCHED RIBBON WINDINGS

BACKGROUND OF THE INVENTION

The present invention relates to electromotive devices including electromagnetically excited machines and permanent magnet synchronous machines (PMM's). For clarity and simplicity, the term permanent magnet synchronous machine (PMM) is used throughout this specification, but it should be clearly understood that the term is intended to include electromotive devices in general, including electromagnetically excited machines.

The electromagnetic forces developed in a PMM result from the interaction of a permanent magnet field with a stator current. This interaction can be fundamentally represented by the relation:

$$F = k * B * K * S$$

Where:
F is the electromagnetic force
k is a proportionality constant depending on geometry,
B is the airgap flux density,
K is the armature surface current density, and
S is the airgap surface area.

In order to increase the power density of the PMM, it is necessary to increase the airgap flux density B or the armature surface current density K, or the airgap surface area S (however increasing the airgap surface area typically implies making a larger machine, which may well increase the power but not the power density of the device). The airgap flux density B is limited by the magnetic properties of the permanent magnets and the saturation properties of any flux-carrying components. The maximum current density K is ultimately limited by the conductor insulation temperature rating and the thermal demagnetization of the permanent magnets. These temperatures, in turn, depend on the machine's inherent thermal characteristics and cooling mechanism. Most approaches to increasing power density use aggressive cooling methods to allow more current for a given temperature rise.

SUMMARY OF THE INVENTION

The present invention provides for electromotive device designs incorporating multiple phase windings, each winding including one or more notched ribbon conductors, which results in higher power density devices than those available in the prior art. The designs improve the performance of the parameters affecting the electromagnetic force generated by the device, especially the armature surface current density "K", and to some extent the airgap surface area S.

The notched ribbon conductors of the present invention may be utilized in axial gap machines, in radial gap machines, or in linear actuators, and may be applied to both coil and wave windings. The conductors may use a standard ribbon having a constant thickness and height, or they may use custom-shaped ribbon conductors which have variable thickness and/or variable height. In any event, the planar conductor or ribbon conductor has a thickness which is substantially less than the height (or width) of the conductor.

The windings of the present invention are typically divided into three areas: the working area (or working length) where the conductor cuts across the magnetic field generated by the magnets, the interior end-turn area, and the exterior end-turn area. The end-turns connect two working lengths of the winding, and they are typically also divided into two areas: the cross-over areas (or cross-over lengths, of which there are typically two at each end-turn and which include the area where two phase windings cross over each other), and the bridging area (or bridging length). The cross-over lengths may be further subdivided into transition lengths which flank the actual cross-over or intermesh area itself and thus provide a transition piece between the working length and the intermesh area, and between the intermesh area and the bridging length. Notches cut in the windings at the cross-over areas are cut so as to reduce the height dimension, at the notch area, of all the ribbon conductors comprising a winding.

The multiple phase windings of the present invention utilize ribbon conductors with notches in the phase cross-over areas instead of using wire conductors. This results in many advantages, including:

Lower electrical resistance: A ribbon winding has a higher copper fraction (i.e. % of copper, as opposed to insulation and air, which fills a slot area), with fractions of 90% or more possible in contrast to copper fractions in the 60% range for round wire windings. The windings of the present invention have notched cross-over areas (areas where one phase winding crosses over another phase winding), and these notches increase the resistance to the flow of electricity. Thus, it is counter-intuitive to use notches in the cross-over areas. However, the use of these notches, as compared to bending of the windings past each other, results in a substantial reduction in the required length of the end-turns of the windings, and this reduction in end-turn length more than compensates for the increase in electrical resistance due to the notches. Note that the end-turn areas are typically, but not necessarily, non-work-producing areas of the windings, so reducing the length of these end-turns areas improves performance of the device by reducing the overall thermal and electrical resistances and by allowing a smaller device for a higher power density.

Lower thermal resistance: Thermal resistance is a property relating the temperature rise in the winding to its heat conduction (or heat flow). It is a measure of how difficult it is for heat to flow out of the winding. With single stator, dual rotor, axial gap PMM's, heat generated by the windings primarily flows out through the exterior end-turn/housing interface. The high copper fraction of the ribbon windings of the present invention (almost equivalent to solid copper) allows heat to flow easily along the length of the winding to the end-turns, which are clamped to the PMM's housing, which acts as a heat sink to cool the windings. Furthermore, the notched cross-over areas allow both axially oriented faces of the end-turns to contact the housing in the "bridging" length of the end-turns, thereby increasing the thermal contact area for more effective cooling, since both end-turn faces are available for heat transfer.

Greater Magnetic Airgap area: The use of notches resulting in planar stator faces often allows the magnetic airgap surface area S to be increased by extending partially over the end turn areas, where the conductors are transitioning from radial to tangential orientations, but still have a significant radial component which can contribute to torque production.

More Compact Structure: The use of notches allows the radial height of the end-turns (as well as lengths) to be shorter for a more compact winding structure. This, in turn, allows smaller machines with greater power density to be constructed.

Another benefit of this PMM design is that the actuator housing can be totally enclosed with minimal impact of cooling performance (since cooling primarily occurs by end-turn conduction, not internal convection of the windings).

BRIEF DESCRIPTION OF THE DRAWINGS

FIG. 3 is a partially exploded perspective view of the stator and rotor assembly of FIG. 2;

FIG. 14 is a perspective view of a ribbon coil array, similar to that shown in FIG. 12, but for use in a linear actuator similar to that shown in FIG. 14A and with the electrical connectors shown;

DESCRIPTION OF THE PREFERRED EMBODIMENTS

Figure 1:
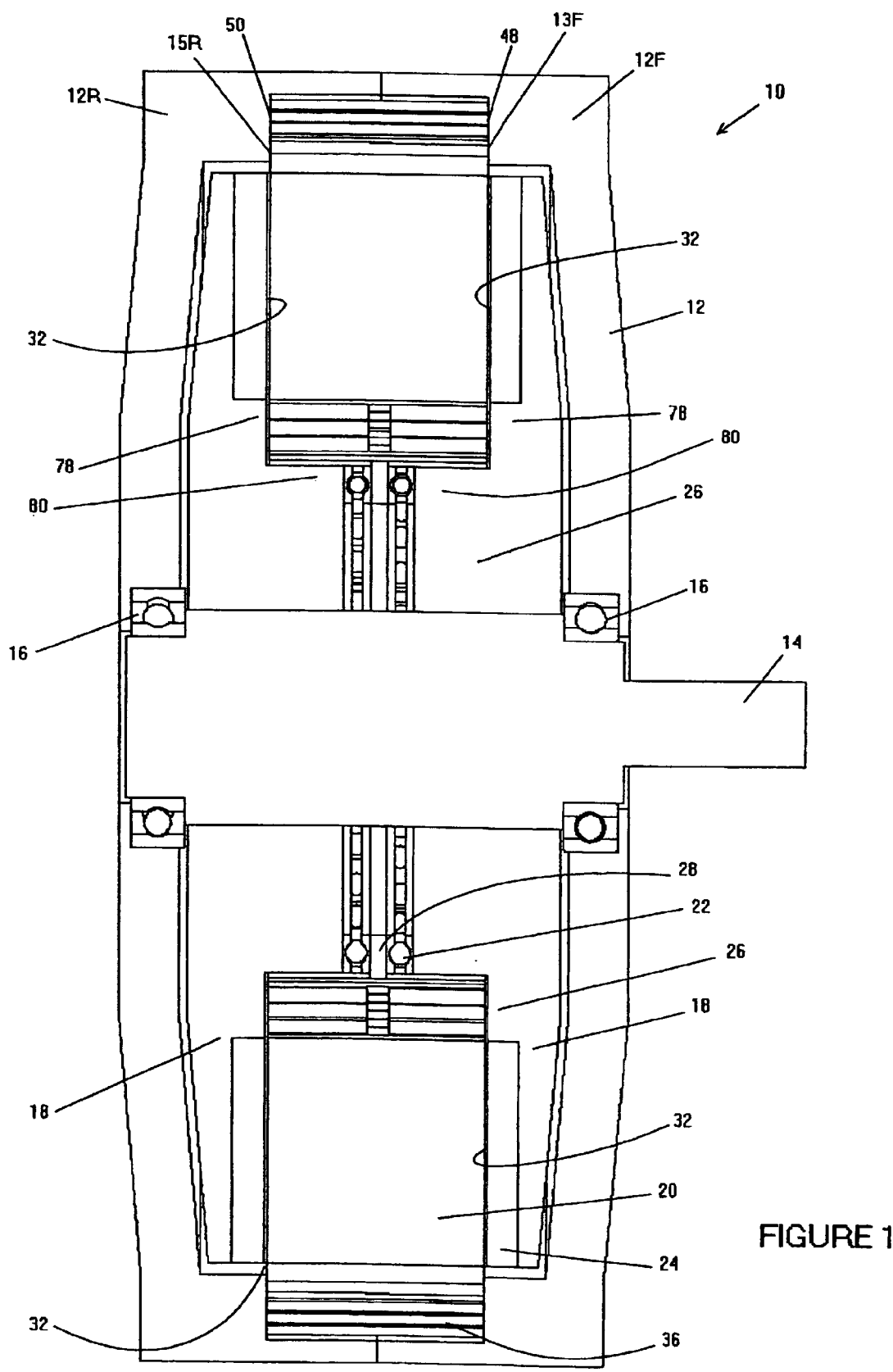
FIG. 1 is a cross-sectional view of an axial gap permanent magnet synchronous machine (PMM) made in accordance with the present invention.

FIG. 1 is a sectional view (cross-hatching not shown for clarity) of an embodiment of a permanent magnet synchronous machine (PMM) 10 made in accordance with the present invention. The PMM 10 includes a housing 12, which is made up of a front housing portion 12F and a rear housing portion 12R. It also includes a shaft 14, which is supported for rotation by radial bearings 16, one or more rotor disks 18 (also referred to as rotors 18), which rotate with the shaft 14, one or more stators 20 which are secured, as by clamping, to the housing 12, and a plurality of thrust bearings 22. As will be explained later in more detail, the front housing portion 12F has a front flange portion 13F, and the rear housing portion 12R has an opposed, rear flange portion 15R. The front and rear axial faces 48, 50 of the exterior end-turn portions 64 (See FIG. 20) of the stator 20 are clamped between these opposed front and rear flanges 13F, 15R.

Figure 2:
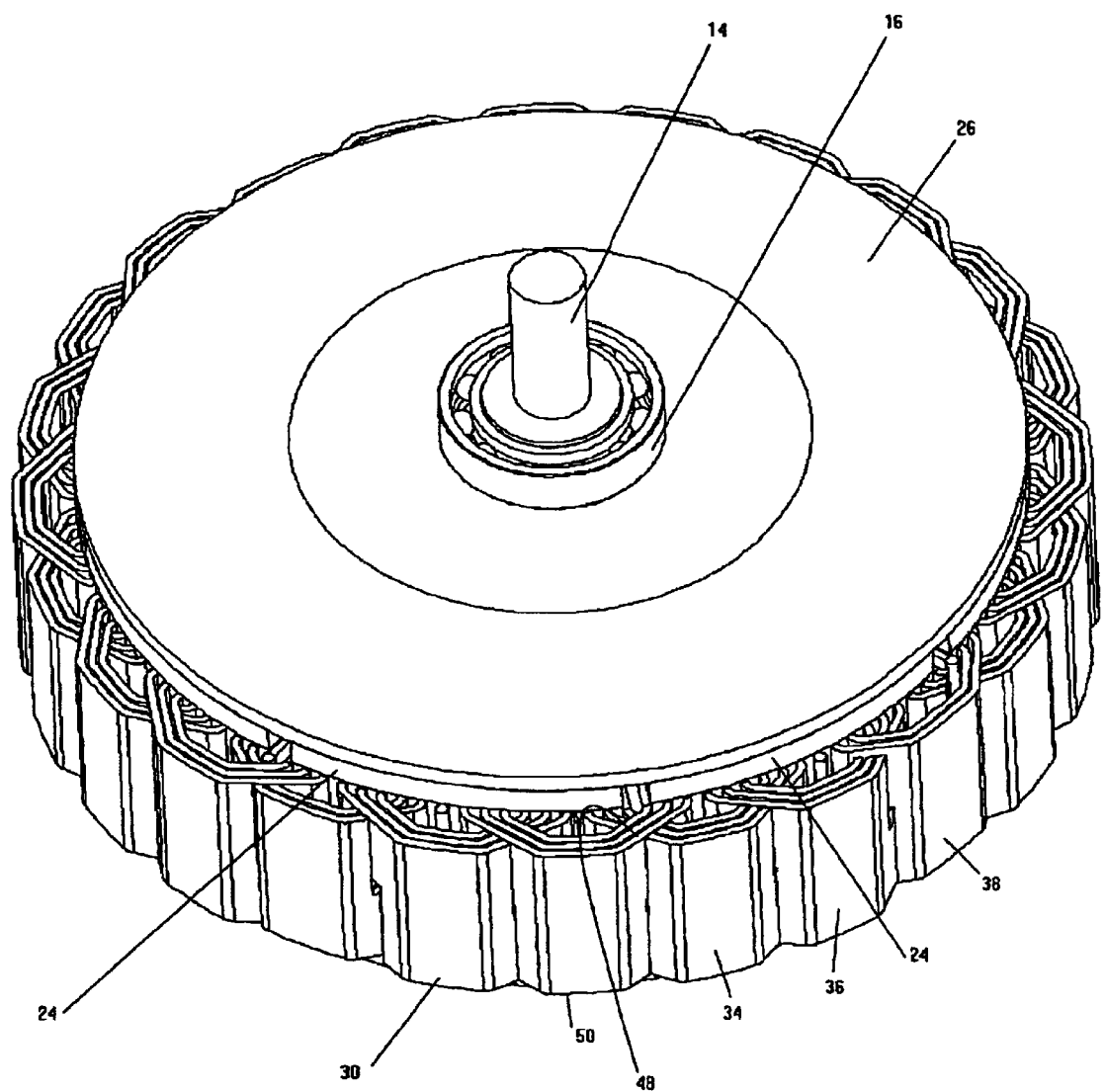
FIG. 2 is a perspective view of the stator and rotor assembly of FIG. 1, with the housing removed for clarity.

Referring to FIGS. 1, 2, and 3, each of the rotors 18 include a thrust bearing 22, magnets 24 (which are typically permanent magnets 24 but which may be electromagnets), and a flux return disk 26, which is typically made out of a ferrous material. The magnets 24 are attached to the flux return disk 26 by an adhesive or by other methods known in the industry. Each rotor 18 is mounted for rotation with the shaft 14, which rides on the radial bearings 16 mounted in the housing 12. Each rotor 18 may be keyed or otherwise secured to the shaft 14, as is well known in the industry.

The stator 20 is a toroidal (doughnut-shaped) disk. The toroidal stator 20 includes an inner ring 28, to provide a surface upon which the thrust bearings 22 may act, and a ribbon wave winding array 30, which is described in more detail later. The inner ring 28 may be clamped or otherwise secured to the inner end turns of the stator 20 windings so that the stator 20 may help in taking up the thrust loads generated by the rotors 18. As shown in FIG. 1, the stator 20 is attached to the housing 12 by clamping it between the forward and rear opposed flanges 13F, 15R of the forward and rear housing sections 12F, 12R, and, as the name implies, it is stationary and does not rotate. The rotors 18 and the stator 20 are mounted so as to have a small air gap 32 between them (See FIG. 1). The air gap is the axial distance between the stator 20 and the rotor 18. It usually is desirable for the width of this air gap 32 to be minimized while still not resulting in contact between the rotor 18 and the stator 20 during operation, especially keeping in mind that these parts may expand due to thermal expansion during operation, causing the air gap 32 to shrink. The thrust bearings 22 assist in taking up thrust loads which may impel the rotors 18 toward the stator 20. The rigidity of the flux return disks 26 also contributes to maintaining the separation between the rotors 18 and the stator 20. Some embodiments of the present invention allow for a "beefed up" flux return disk 26, adding to the rigidity of the disk 26 in its resistance to axial thrust loads imparted by the magnets 24, and permitting the rotors 18 to be mounted closer to the stator 20, in order to minimize the size of the air gap 32.

The PMM 10 of FIG. 1 is a dual air gap machine (one stator 20 and two rotors 18), and is also referred to as an axial air gap machine, because the air gap 32 between the rotors 18 and the stator 20 is axially oriented. A PMM may be a single air gap machine or a multiple air gap machine. It is understood that a PMM made in accordance with the present invention may have as few as a single rotor 18 and a single stator 20, or it may have multiple rotors 18 and multiple stators 20.

Figure 4:
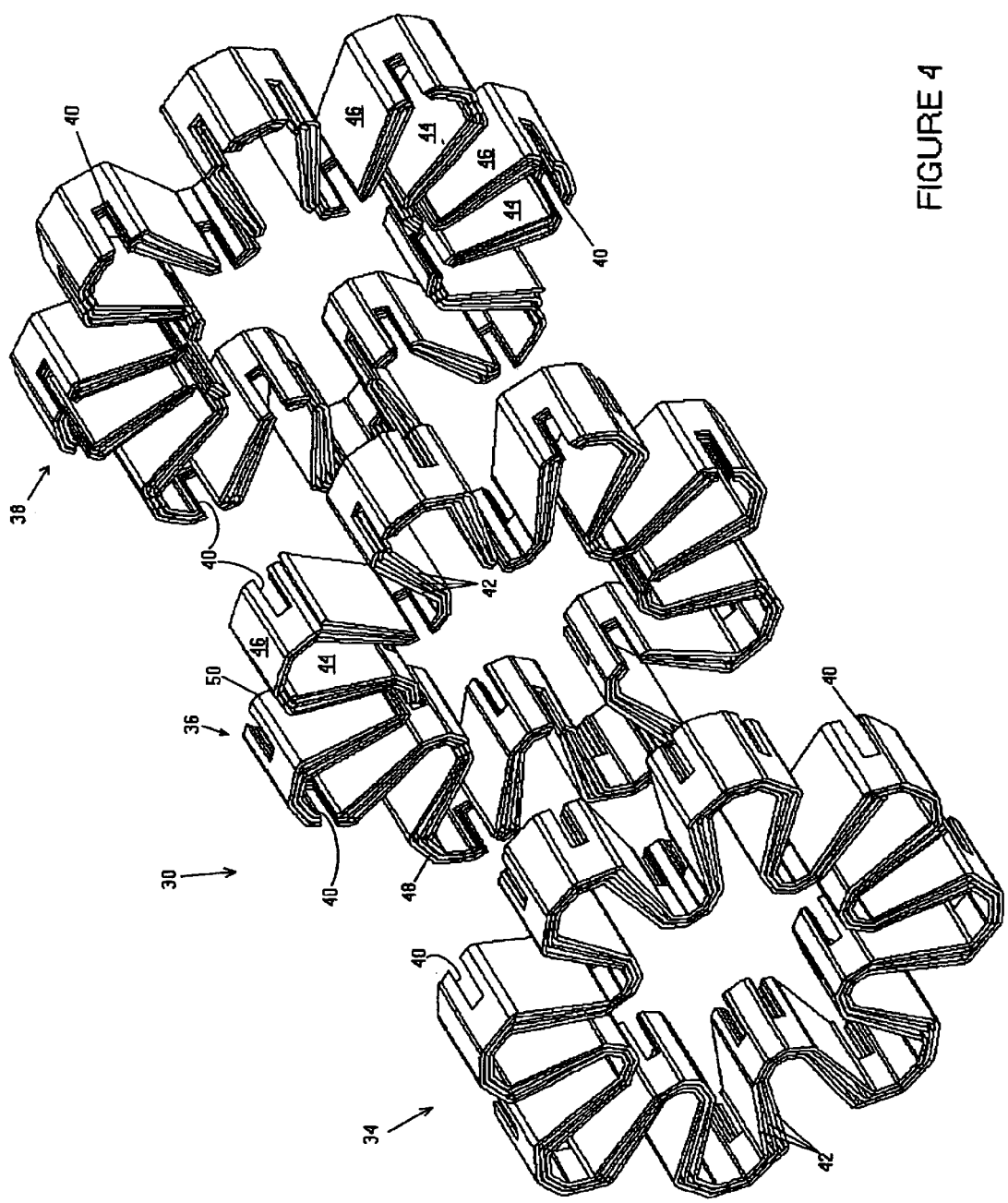
FIG. 4 is an exploded perspective view of a ribbon wave winding array which is part of the stator of FIGS. 1, 2, and 3.
Figure 5:
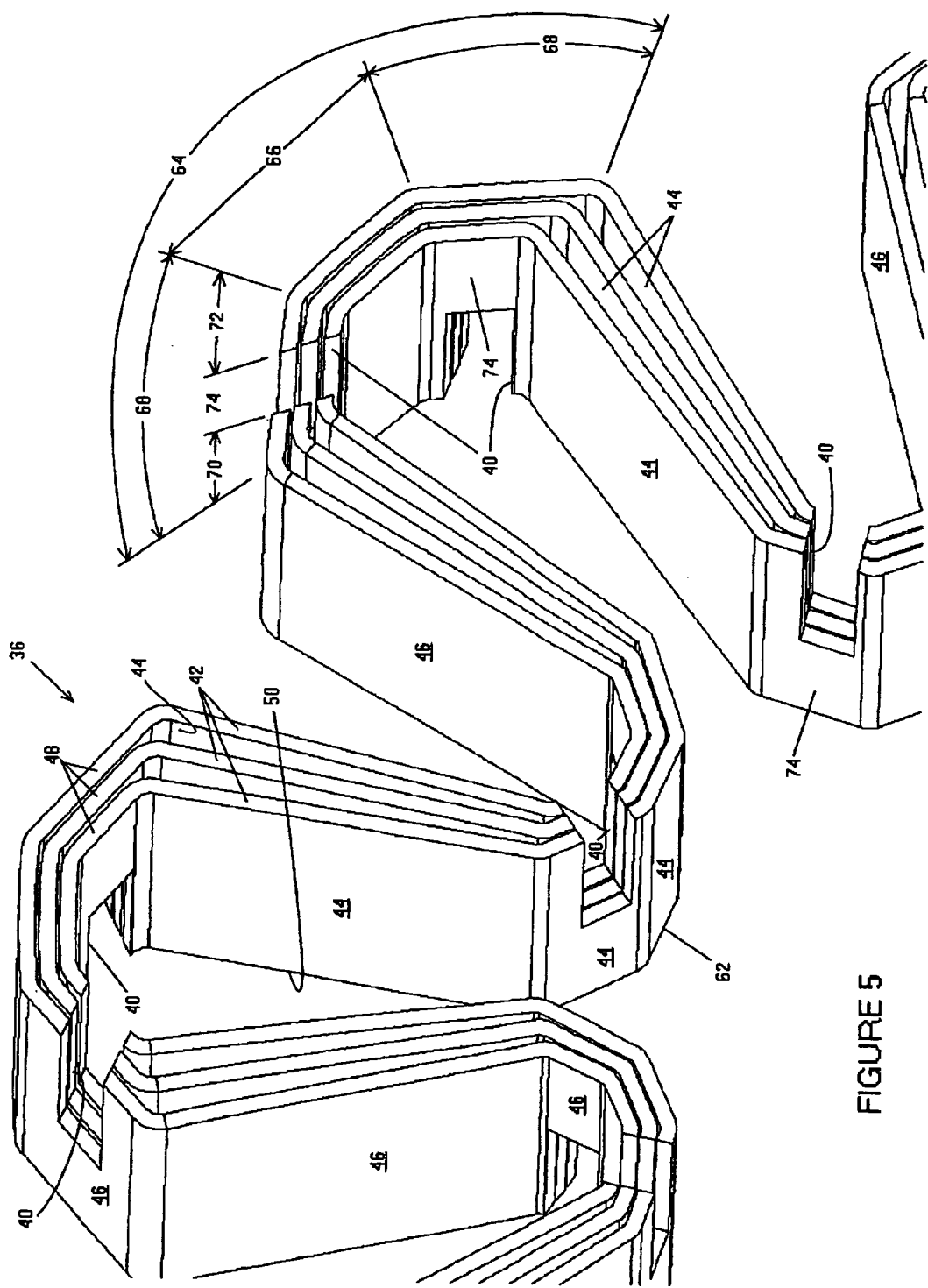
FIG. 5 is an enlarged, detailed view of a section of one of the phases of the winding array of FIG. 4.
Figure 6:
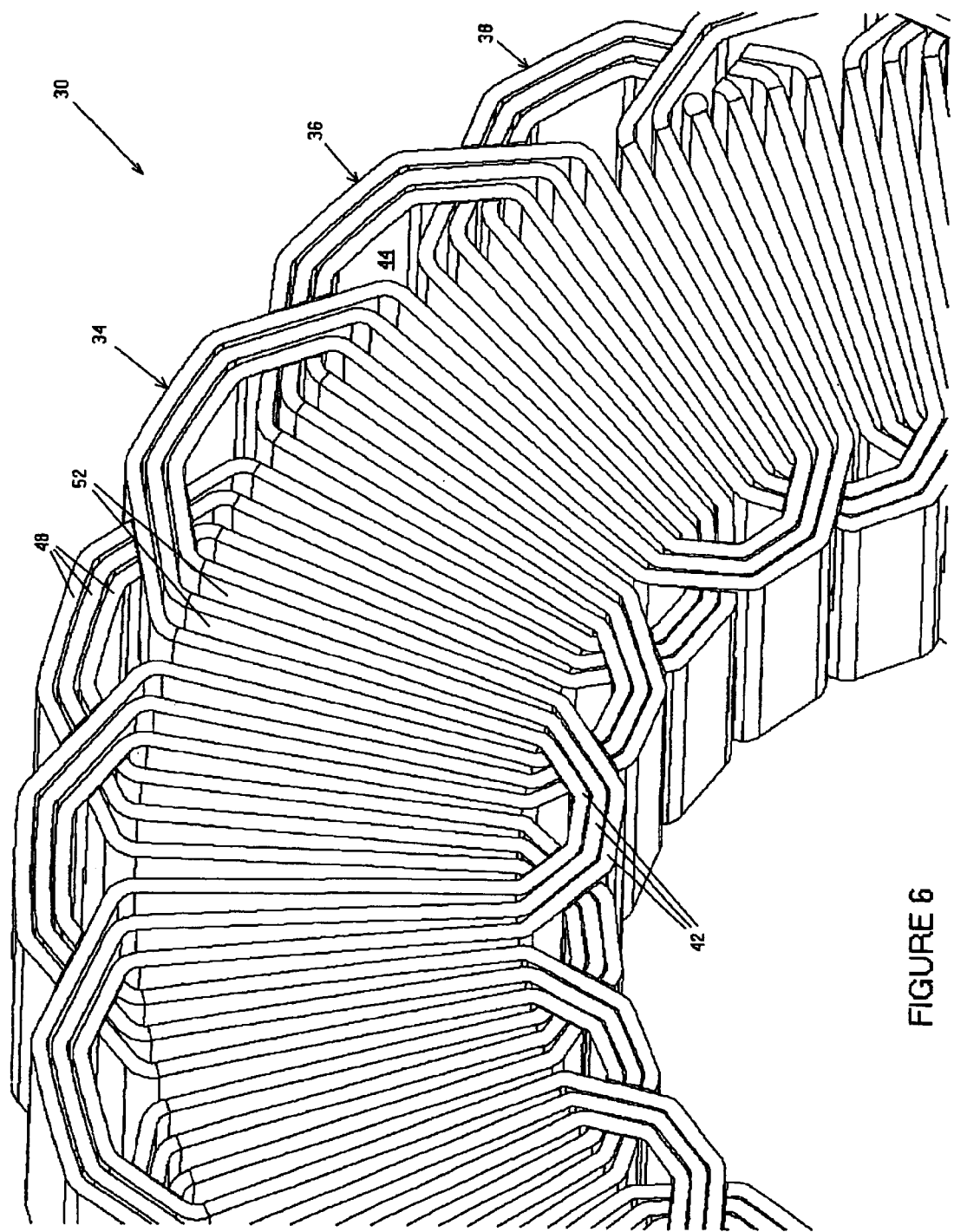
FIG. 6 is a broken away perspective view of the assembled ribbon wave winding array of FIG. 3.
Figure 13:
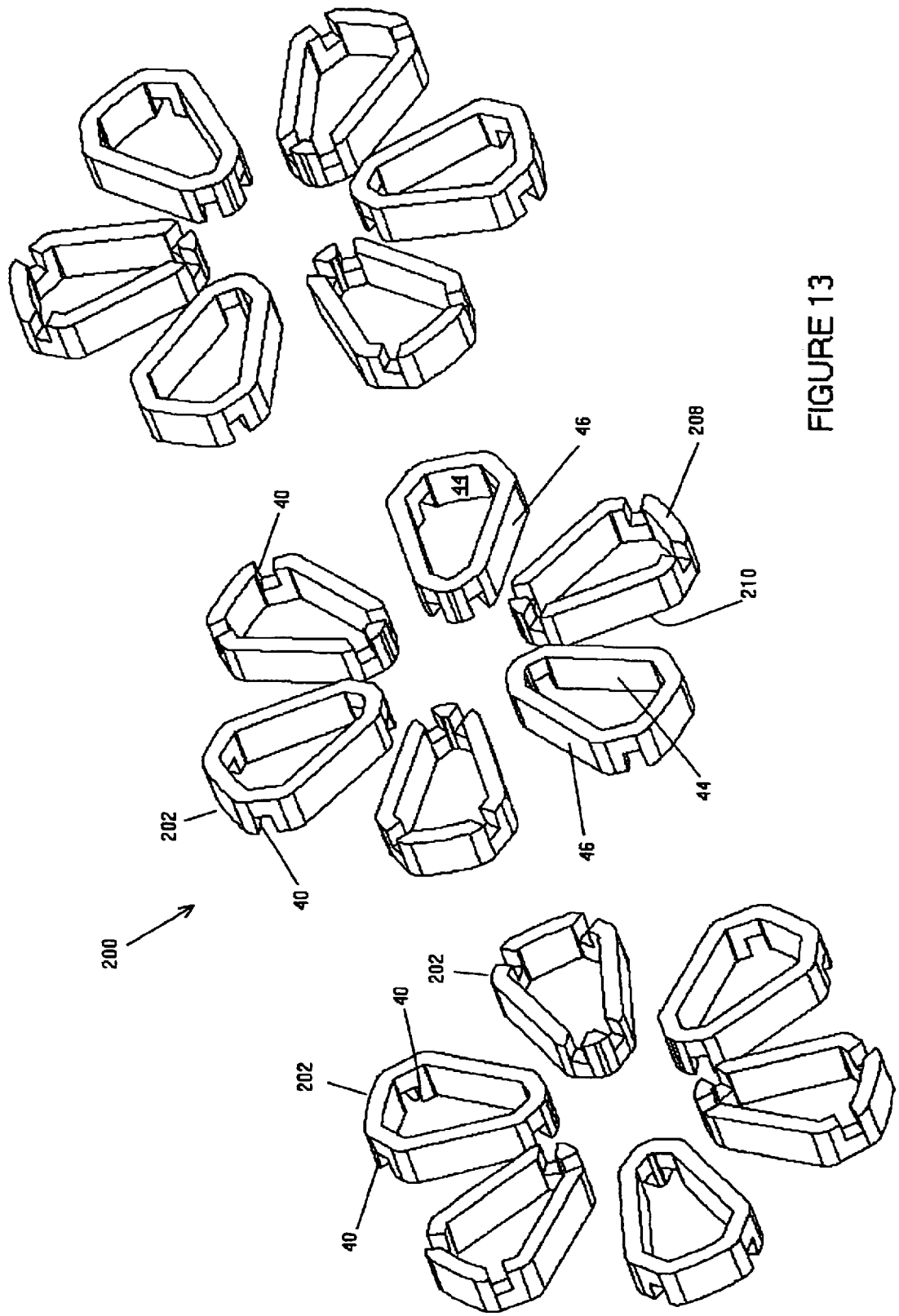
FIG. 13 is an exploded perspective view of the ribbon coil array of FIG. 12.

FIGS. 4, 5, and 6 depict the ribbon wave winding array 30 used in the PMM 10 of FIG. 1. This array 30 includes a plurality of wave windings 34, 36, 38, with each wave winding 34, 36, 38 representing a phase. PMM's may have any number of phases, but typically they have an odd number of phases, with 3 and 5 phases being the most common. The PMM's depicted in the drawings of this specification typically have three phase windings, but it is understood that the number of phases could be different from the three phases depicted. Note that, while the terms phase winding and wave winding are often used interchangeably in this description, a phase winding may be configured in an arrangement other than a wave winding. For example, it may be a coil winding 202 as depicted in FIG. 13, which will be described in detail later.

Wave windings 34, and 38 are identical, with one oriented 180 degrees opposite to the other. Wave winding 36 is practically identical to windings 34, 38, except for the locations of the intermeshing notches 40, which lie in alternate faces in the winding 36 instead of being all on the same face as in windings 34, 38, as is described in more detail below. For brevity, only the winding 36 is described in detail, with windings 34, 38 being similar to winding 36 except for the aforementioned location of the intermeshing notches 40.

Wave winding 36, as seen in FIG. 5, includes a plurality of layers of ribbon conductors 42. Each ribbon conductor 42 has first and second flat surfaces 44, 46 (which may be referred to as interior and exterior surfaces 44, 46) and first and second axial edges 48, 50 respectively (which will be referred to as forward and rear edges 48, 50 or forward and rear faces 48, 50 respectively), with the distance between the forward and rear edges 48, 50 respectively of each ribbon conductor 42 defining a ribbon height and the distance between the interior and exterior surfaces 44, 46 respectively of each ribbon conductor 42 defining a ribbon thickness, which is substantially less than the ribbon height. The ribbon heights are substantially reduced at the notches 40.

Ribbon conductors 42 are layered, with the interior and exterior surfaces 44, 46 of adjacent layers lying flat against each other to form the individual winding 36 corresponding to a single phase. Note that each ribbon conductor 42 is made of a conductive material and is fully insulated all the way around so that the interior and exterior surfaces 44, 46 and the forward and rear edges 48, 50 of the ribbon conductor 42 are actually non-conductive insulation material. However, by convention, the insulation material is all considered to be part of the ribbon conductor 42, just as a typical electrical wire includes an insulating jacket enveloping a conductive copper core. Note also that the adjacent layers of ribbon conductors 42 need not necessarily be in contact with each other throughout the entire length of the winding 36. In fact, as defined and described later, and as depicted in FIG. 6 in particular, the layers of ribbon conductors 42 in the working lengths of the windings 34, 36, 38 are separated by gaps 52, which may be filled with iron inserts to enhance the magnetic field, and those gaps 52 may be present to a greater or lesser extent throughout the entire length of the winding 36, as described in more detail later.

Figure 20:
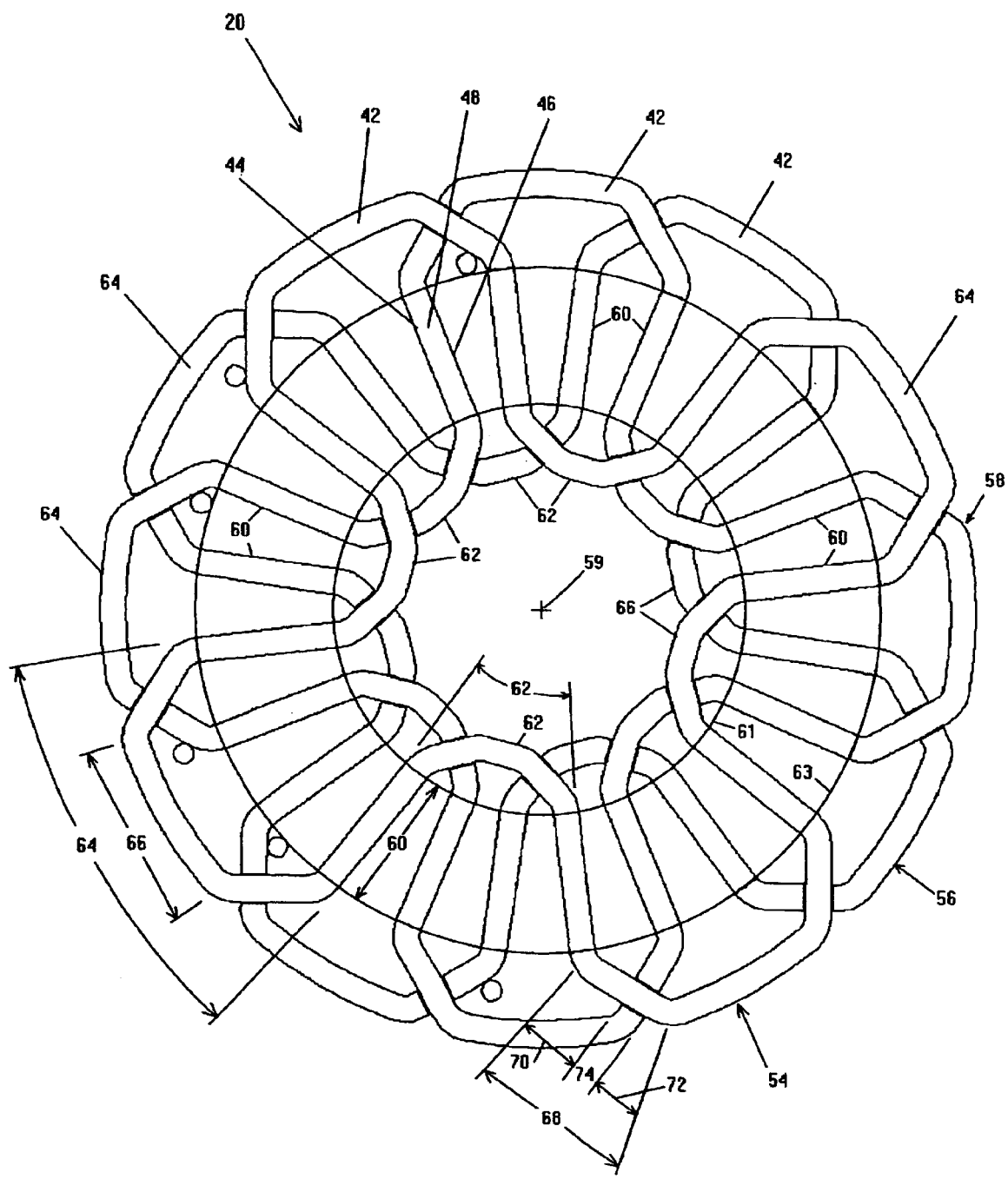
FIG. 20 is a schematic plan view of a ribbon wave winding array, similar to that of FIGS. 3 and 4, except that each phase has considerably fewer waves, and with each phase winding shown as a solid piece for clarity, but with the understanding that each phase winding is made of a plurality of layers of ribbon conductor.

FIG. 20 is a schematic plan view of a multiple phase winding 20, which helps define the different sections of a phase winding. For the sake of clarity, it depicts only three phase windings 54, 56, 58, and each of the phase windings 54, 56, 58 is depicted as a single layer of ribbon conductor 42, even though each phase winding 54, 56, 58 would likely include a plurality of layers of ribbon conductor 42.

Each of the phase windings 54, 56, 58 has a plurality of working length sections 60, interior end-turn sections 62, and exterior end-turn sections 64. Doffed lines 61, 63 are shown in this view to denote where one section ends and the other begins. Inside the dotted line 61 are the interior end turn sections 62; between the dotted lines 61, 63 are the working length sections 60, and outside the dotted line 63 are the exterior end-turn sections 64. The working length sections 60 extend in a radial direction relative to the center axis of rotation 59. The end-turn sections 62, 64 may be further defined as including bridging sections 66 and crossover sections 68. The bridging sections 66 lie essentially along a circle having its center at the axis of rotation 59, so they are essentially perpendicular to the adjacent working length sections 60. The crossover sections 68 extend from the bridging sections 66 to the working length sections 60. The crossover sections 68 may, in turn, be further defined as including transition sections 70, 72 and intermesh sections 74. The intermesh sections 74 are where two windings cross each other, at substantially right angles, and correspond to the locations of the intermeshing notches 40 (See FIG. 5).

FIG. 20 also clearly shows the interior and exterior flat surfaces 44, 46 of the ribbon conductors 42 and the forward axial edge 48 of the ribbon conductor 42. The intermeshing notches 40 (See FIG. 5) cut across all layers of conductors 42 of the winding 36, reducing the height dimension of every ribbon conductor 42 at the intermesh portion 74 of the end-turn sections 62, 64. The bridging section 66 and even the transition portions 70, 72 may remain at the full height dimension of the ribbon conductor 42.

Figure 17A:
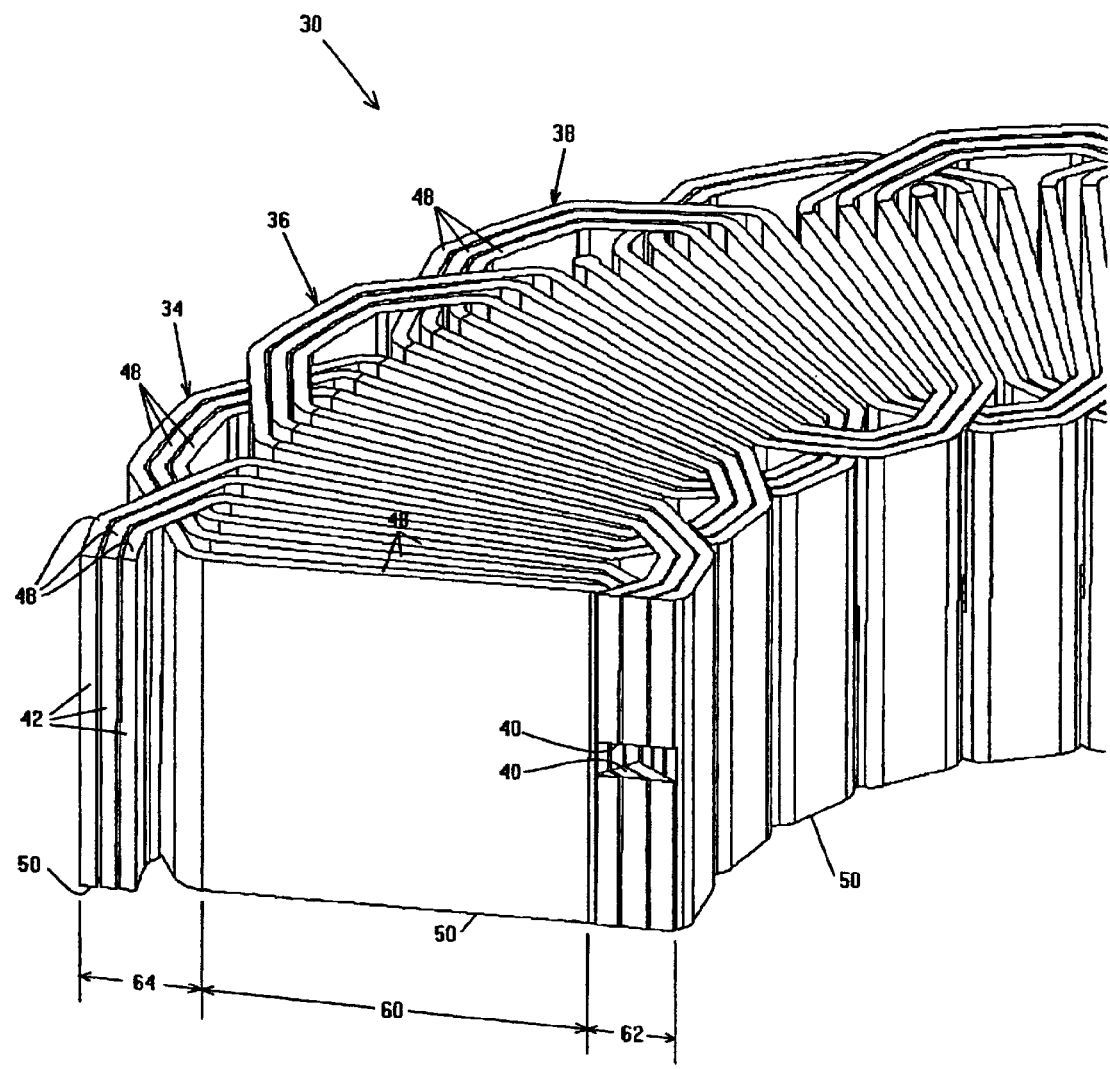
FIG. 17A is a perspective, sectional view (section lines omitted for clarity) of the ribbon wave array of FIG. 16, showing the constant height profile of the conductors throughout the working length and the interior and exterior end-turns.

Note that, because of the use of the intermeshing notches 40, the windings do not have to be shifted in an axial direction in order to cross over each other, thereby making the overall end-turn lengths 62, 64 shorter than they would otherwise have to be, which results in lower overall electrical resistance losses, despite the fact that the notches 40 create a higher, localized electrical resistance at the intermesh portion 74. FIG. 17A shows a section taken along a pair of intermeshing notches 40, and shows how the use of the intermeshing notches 40 allows the forward axial edges 48 of all the winding phases 34, 36, 38 to lie on a same first plane (also referred to as a first planar face directed in a first axial direction), as well as allowing the rear axial edges 50 of all the winding phases 34, 36, 38 also to lie on a same second plane (also referred to as a second planar face directed in a second and opposite axial direction). Therefore, as seen in FIG. 1, the flange 13F of the front housing portion 12F butts up against all of the forward axial faces 48 (or against the first planar face) of all of the windings 34, 36, 38, and the flange 15R of the rear housing portion 12R butts up against all of the rear axial faces 50 (or against the second planar face) of all of the windings 34, 36, 38 at the exterior end-turn sections 64 of the winding array 30, resulting in good conductive heat transfer between every layer of the ribbon conductors 42 and the housing 12, which, in turn, results in very effective cooling of the stator 20.

As may be appreciated from FIGS. 1, 3, 5, and 6, the height dimension of the conductor ribbon 42 is the same throughout the entire length of the array 30, except at the intermesh portions 74 where the height is reduced to form the notches 40. The forward edges 48 of all the conductor ribbons 42 lie on one plane, the first planar face, except at the intermesh portions 74, and the rear edges 50 of all the conductor ribbons 42 lie on another plane, the second planar face, except at the intermesh portions 74. As best seen in FIG. 1, this allows the flux return disk 26 to have an increased thickness at 78. The flux return disk 26 also is able to have an increased thickness at 80, since the interior end-turn sections 62 are shorter that they would otherwise be, again because of the intermeshing notches 40. This results in a "beefed up" rotor 18, which is better able to withstand flexing forces acting on the rotor 18 due to axial thrust loads caused by the magnets 24, thus allowing for a smaller air gap 32 without unduly risking contact between the rotor 18 and the stator 20.

It should be noted that all the forward edges 48 of all ribbon conductors 42 need not necessarily lie on a same first plane, and that all the rear edges 50 of all ribbon conductors 42 need not necessarily line on a same second plane, as may be seen in other embodiments described later. However, it is preferred for all the forward edges 48 in the exterior bridging portions 66 of the exterior end-turn sections 64 to lie on a same first plane (the first planar face) and all the rear edges 50 (rear faces 50) in the exterior bridging portions 66 of the exterior end-turn sections 64 to lie on a same second plane (the second planar face) to ensure good contact between the housing 12 and both faces of the winding array 30 where the housing 12 is clamped to the winding array 30, resulting in good conductive heat transfer out of the winding array 30.

Figure 31:
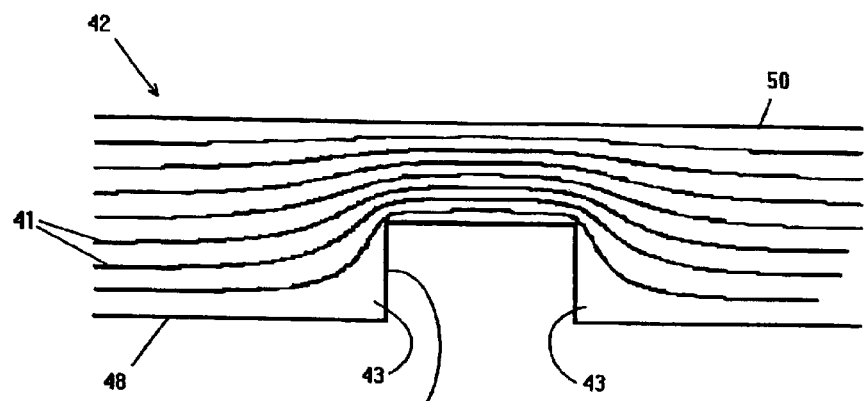
FIG. 31 is a cross-sectional view of a notch cut into a conductor made in accordance with the present invention, with lines showing current flow (not ribbon layers)
Figure 32:
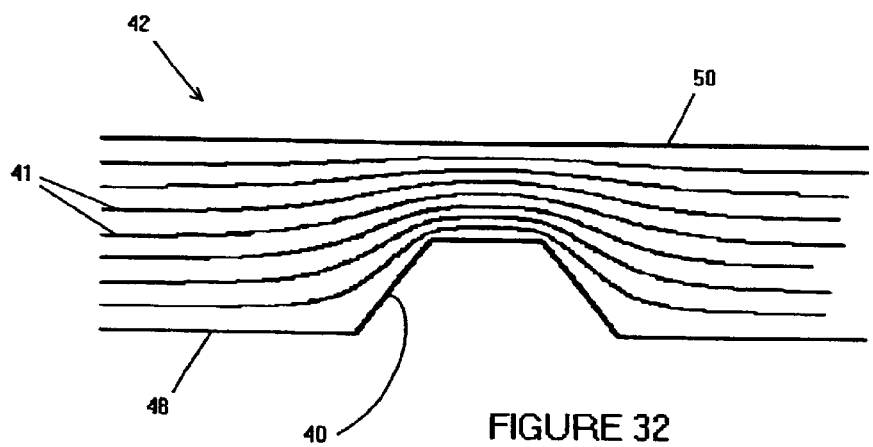
FIG. 32 is a cross-sectional view of another notch, similar to FIG. 31, but with the notch having a trapezoidal shape that improves current flow for a given resistance increase due to the notch.

FIG. 31 schematically depicts a notch 40 cut into the forward face 48 of a ribbon conductor 42. The lines 41 represent electrical current stream density. As may be appreciated, areas 43 are areas of low current density. FIG. 32 depicts an alternately shaped trapezoidal notch 40' on the same conductor 42 which results in more efficient current flow past the notch 40', resulting in lower electrical resistance losses.

DISCUSSION OF THE PRIOR ART

Figure 7:
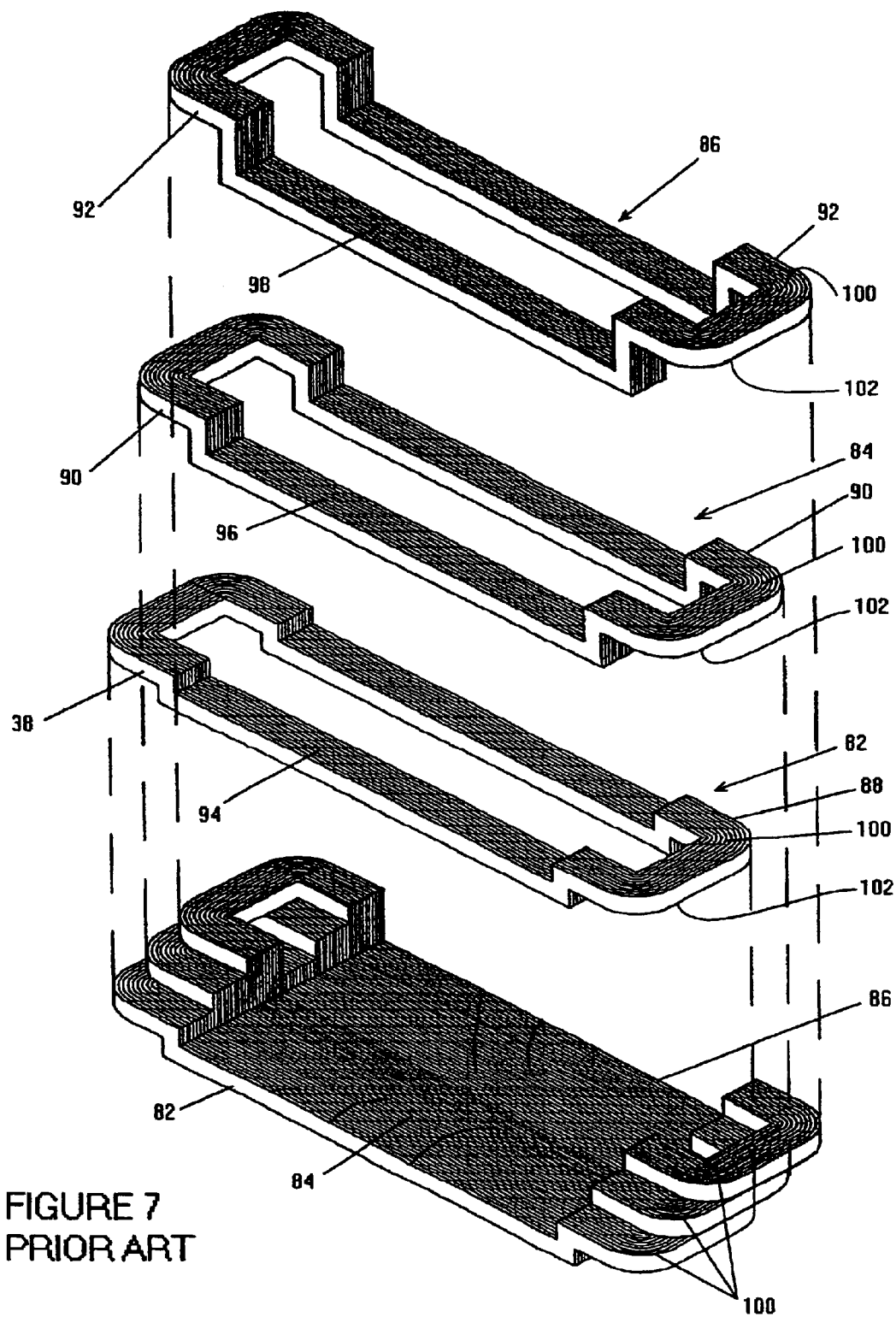
FIG. 7 is a perspective view of a multi-phase winding array of the prior art (shown also in an exploded view)
Figure 9:
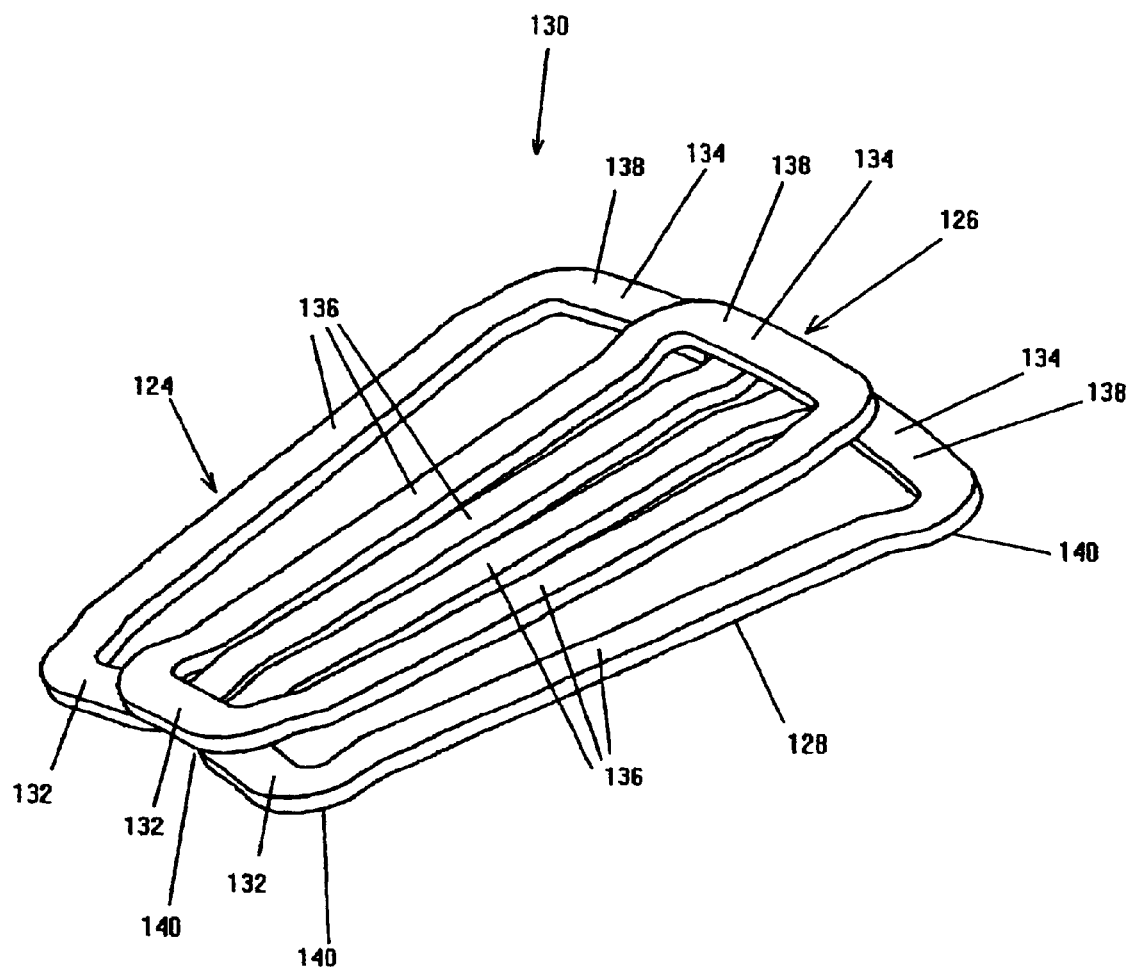
FIG. 9 is a perspective view of yet another winding array of the prior art.
Figure 10:
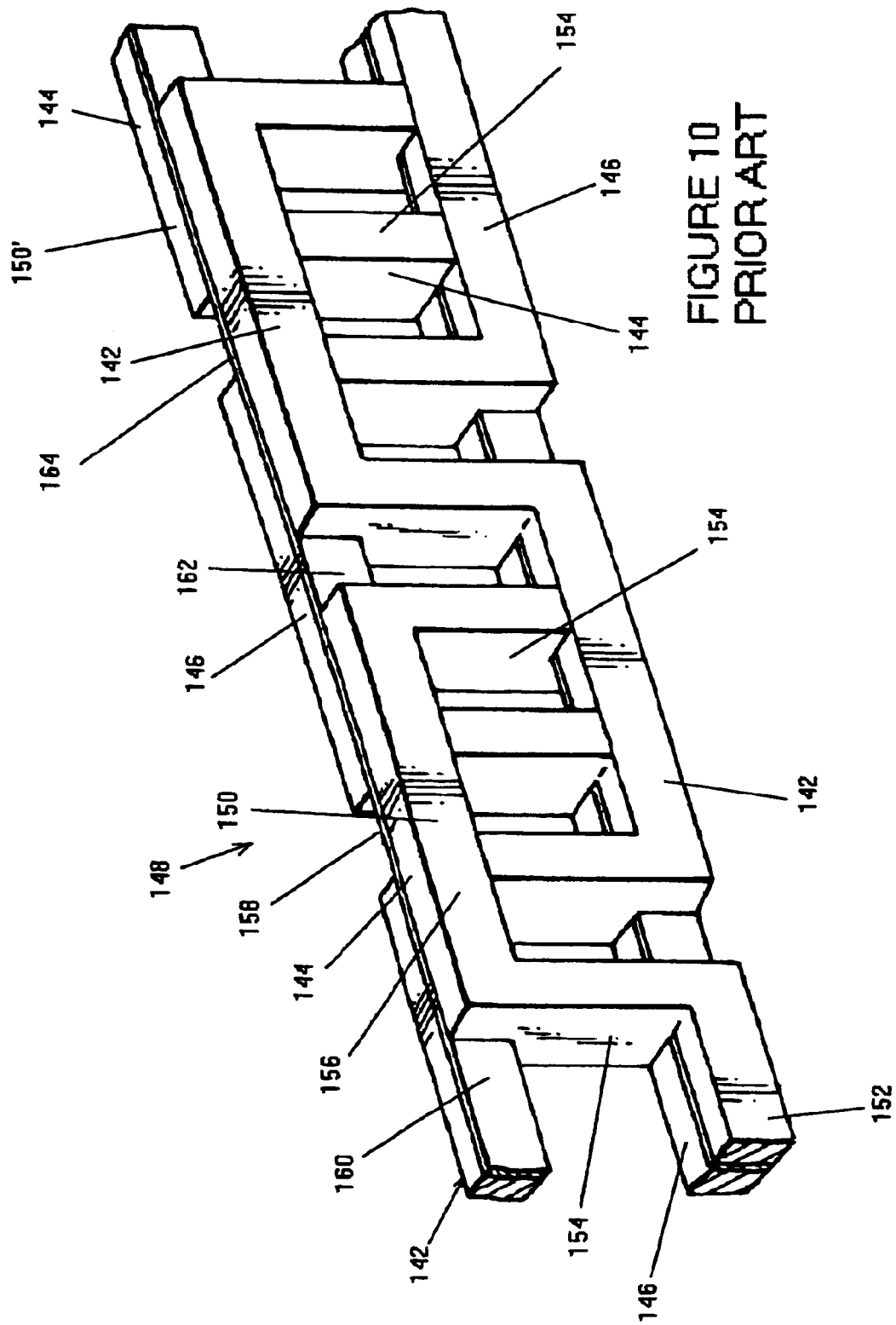
FIG. 10 is a perspective view of yet another winding array of the prior art.
Figure 11:
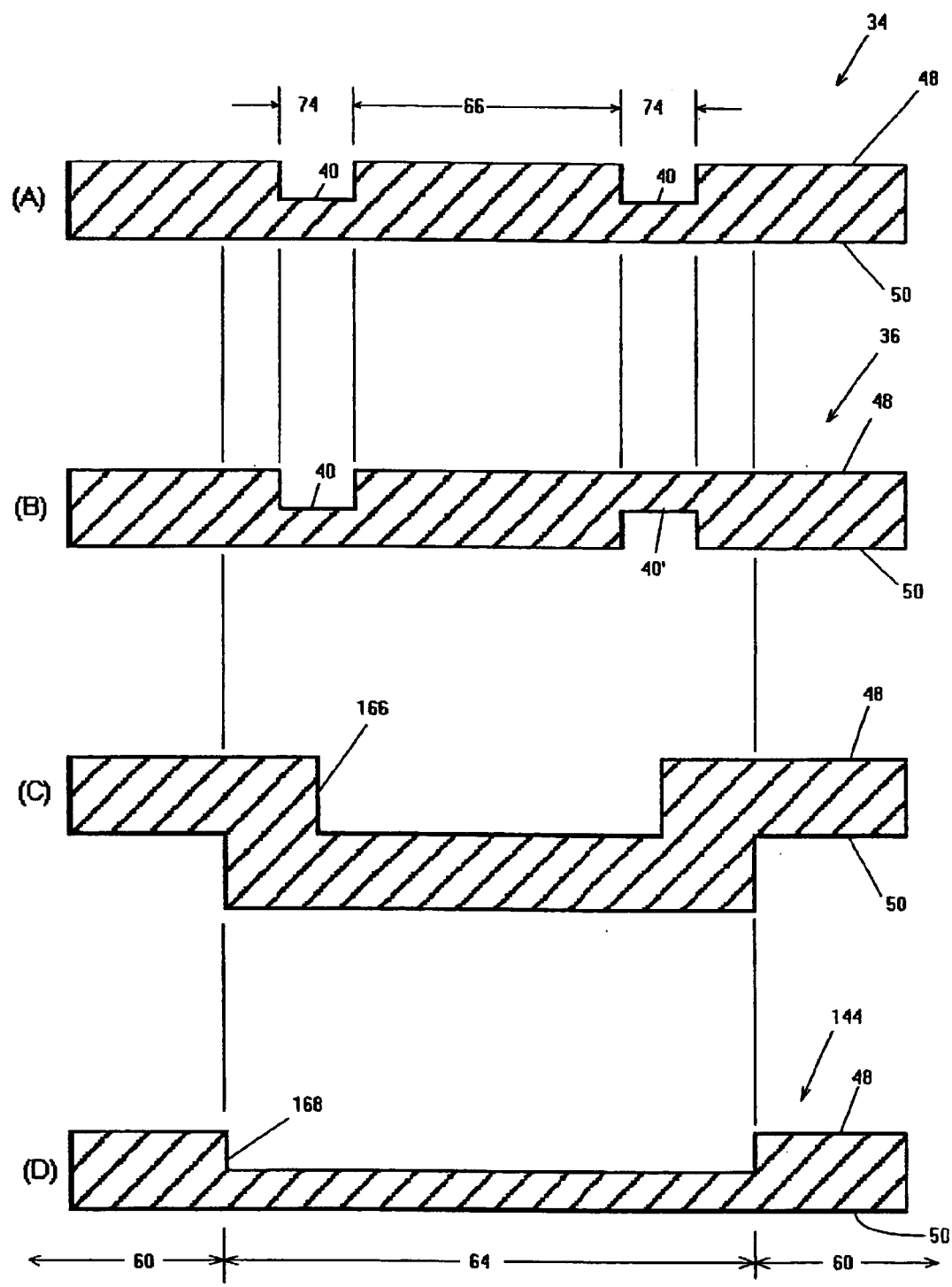
FIG. 11 is a comparison sketch of sections through prior art end-turn designs and end-turn designs of the present invention.

FIGS. 7–10 show some prior art designs for phase windings, and FIG. 11 is a section view comparing some of these windings with the windings 34, 36, used in the embodiment of FIG. 1. FIG. 7 shows windings 82, 84, 86 disclosed in U.S. Patent Application Publication No. US 2002/0079775 A1 "Janssen", dated Jun. 27, 2002, which is hereby incorporated by reference. Their corresponding end-turn portions 88, 90, 92 lie at different elevations so that they may nest with each other, with their working length sections 94, 96, 98 lying along a first plane. The end-turn portions 88, 90, 92 do not have intermeshing notches as in the embodiment of FIG. 1. It may be appreciated that the forward and rear edges 100, 102 respectively of the windings 82, 84, 86 at the end-turn portions 88, 90, 92 do not lie on the same plane. In fact, if housing portions (not shown) are clamped onto the end-turn portions 88, 90, 92 so as to trap the end turn portions 88, 90, 92 between the housing portions, the forward housing portion would be in contact with the forward edge 100 of only one winding 86, and the rear housing portion would be in contact with the rear edge 102 of only one winding 82. The middle winding 84 would have neither its forward nor its rear edges 100, 102 in contact with either housing portion. Any heat rejection from the middle winding 84 via its end-turn portions 90 would first have to go either through the end-turn portions 92 of the top winding 86 or through the end-turn portions 88 of the bottom winding 82 in order to reach the housing. Furthermore, heat can only be conducted out of the top winding 86 through the forward edge 100 (or forward face 100) of the end-turn portions 92 of the top winding 86, since the rear edge 102 is not in contact with the housing. Similarly, heat can only be conducted out of the bottom winding 82 through rear edge 102 (or rear face 102) of the end-turn portions 88 of the bottom winding 82, since the forward edge 100 is not in contact with the housing. This arrangement results in relatively poor conductive heat transfer to the housing for the Janssen winding array.

Figure 8:
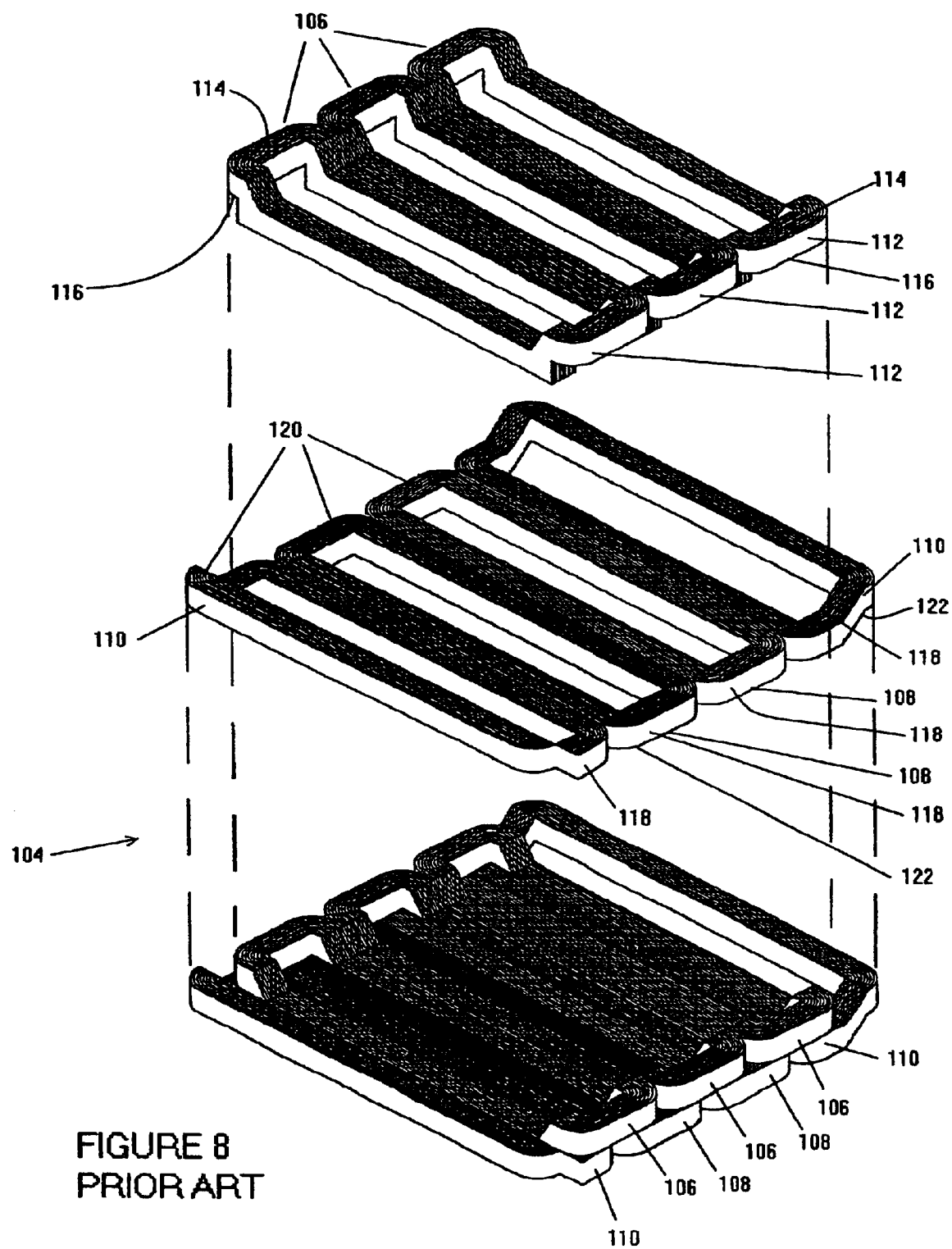
FIG. 8 is a perspective view of another winding configuration of the prior art (shown also in an exploded view)

FIG. 8 shows a second Janssen winding array 104, taken from the same U.S. Patent Application Publication No. US 2002/0079775 A1. This second Janssen winding array 104 is made up of identical upper phase windings 106, which nest with lower phase windings 108 and end phase windings 110. The end turn portions of the upper phase windings 106 are offset upwardly from their working length portions and lie at a higher elevation than the end turns of the lower phase windings 108. This permits the end turn portions of adjacent phase windings to extend parallel to each other as opposed to extending in different directions so as to cross each other at intermeshing notches. As in the previously disclosed Janssen winding array, this new array 104 has its end-turns at different elevations. The end-turns 112 of the upper phase windings 106 define forward faces 114 and rear faces 116 lying at a higher elevation than the forward and rear faces of their respective working sections. The end-turns 118 of the lower phase windings 108 and of the end phase windings 110 also define forward faces 120 and rear faces 122. When these upper, lower, and end phase windings 106, 108, 110 are assembled as shown, the rear faces 116 of the end turns 112 of the upper phase windings 106 rest on top of the forward faces 120 of the end turns 118 of the lower windings 108 and on top of a portion of the forward faces 120 of the end turns 118 of the end phase windings. If housing portions (not shown) are clamped onto the end-turn portions 112, 118 so as to trap the end turn portions 112, 118 between the housing portions, the forward housing portion would be in contact with only the forward faces 114 of the upper windings 106 and with a small portion of the forward faces 120 of the end windings 110, and the rear housing portion would be in contact with only the rear faces 122 of the lower windings 108 and part of the rear faces 122 of the end windings 110. Once again, this arrangement results in relatively poor conductive heat transfer from the windings to the housing.

FIG. 9 shows the Kessinger winding array, disclosed in U.S. Pat. No. 5,744,896 dated Apr. 28, 1998, which is hereby incorporated by reference. All three phase windings 124, 126, 128 of the Kessinger design are identical, with the end turn portions offset from the working length portions, and with the winding 126 flipped upside down when assembled into the array 130 so that their corresponding interior and exterior end-turns portions 132, 134 respectively extend parallel to each other and lie at different elevations, so that they may nest with each other and still have the working length portions 136 of the windings 124, 126, 128 lying along the same plane. If flat flanges of housing portions (not shown) are clamped onto the exterior end-turn portions 134 so as to trap the end turn portions 134 between the housing portions, the forward housing portion would be in contact with only the forward faces 138 of the winding phase 126, and the rear housing portion would be in contact with only the rear faces 140 of the winding phases 124, 128. Once again, this arrangement results in relatively poor conductive heat transfer from the winding array to the housing portions.

FIG. 10 shows phase windings disclosed in U.S. Pat. No. 6,373,164 B1 "Nishimura", which is hereby incorporated by reference. Referring specifically to phase winding 144 (though it applies to all three phase windings 142, 144, 146), the upper end-turn portions 150, 150' and the lower end-turn portions 152 have approximately half the "depth" of the working length sections 154. Also, the end-turn portions alternate sides so that, for instance, the upper end-turn portion 150 faces forward (that is, its forward face 156 may be in full contact with a forward housing portion (not shown), but its rear face 158 is in contact with the front faces 160, 162 of the phase windings 142, 146, respectively, the other upper end-turn portion 150' of the winding 144 is rearwardly displaced relative to the first upper end turn portion 150, so its rear face 158 may be in full contact with a rear housing portion, but its forward face 156 is in contact with the rear face 164 of the phase winding 142. The end turn portions of adjacent phases lie parallel to each other and do not cross each other with intermeshing notches as in the embodiment of FIG. 1. Once again, this arrangement results in relatively poor conductive heat transfer.

FIG. 11 schematically illustrates a section view through the end turn section of various embodiments. This helps show the differences between phase windings of the embodiment of FIG. 1 and those of the prior art referenced above, particularly as they relate to the exterior end-turn portions. FIG. 11(A) depicts phase winding 34 of FIG. 4, with all the crossover notches 40 located on the same face of the winding 34. FIG. 11(B) depicts phase winding 36, with the cross-over notches 40 on alternating faces of the winding 36. Each of these phases individually, and the array combining these phases has essentially the same characteristics, in which the entire exterior end-turn section, with the exception of the intermesh portion 74, has the same height dimension (defined as the distance between the forward face 48 and the rear face 50). The entire exterior end-turn section, with the exception of the intermesh length 74, has its forward face 48 on a first planar face and its rear face 50 on a second planar face. Thus, the flat flange 13F of the front housing portion 12F (See FIG. 1) may be clamped against the forward face 48 at the exterior end-turn length 64, and a rear housing portion 12R may be clamped against the rear face 50 at the exterior end-turn length 64, except at the intermesh lengths 74, for excellent conductive heat transfer from the phase windings 34, 36, 38 of the winding array 30 to the housing 12.

FIG. 11(C) depicts a typical phase winding in the Janssen or in the Kessinger prior art, as in FIGS. 7–9. In these prior art winding arrays, the entire exterior end-turn section of each individual phase has the same height dimension. However, for one or more phases, the entire exterior end-turn section is displaced from the planes defined by the forward and rear faces 48, 50 of the working length portions 60, forming a cavity 166 which is occupied by one or more additional exterior end-turn sections of other phase windings (not shown in FIG. 11 but seen in FIGS. 7, 8, and 9). Thus, the flat flange of a front housing portion cannot be clamped against the forward faces 48 of all the phases at once or against the rear faces of all the phases at once. The result, as stated earlier, is a less effective conductive heat transfer mechanism for cooling of the winding array via the housing.

FIG. 11(D) depicts a typical phase winding in the Nishimura reference of FIG. 10. As may be appreciated, in Nishimura, the entire exterior end-turn length 64 has the same height dimension, but this height dimension is approximately half of the height dimension of the working length portion 60. The entire exterior end-turn length 64 is displaced from the plane defined by the forward face 48 of the working length portion 60, forming a cavity 168. As shown in FIG. 10, another phase lies on top of the forward face 18 of this phase along that cavity. If the flat flange of a front housing portion is clamped against the end turns of the array of FIG. 10, it cannot be clamped against end turn section of the forward face 48, because that portion of the forward face 48 is covered by another phase. The result, as stated earlier, is a less effective conductive heat transfer mechanism, and it results in a path of higher electrical resistance for the entire end-turn length 64 of each phase winding.

DESCRIPTION OF OTHER EMBODIMENTS

FIG. 6 is a broken away, perspective view of the constant height and constant thickness ribbon wave winding array 30 as has already been described. As best seen in the sectional profile of FIG. 17A, the height dimension of the array (defined as the distance between the forward face 48 and the rear face 50) is constant throughout the array 30, both in the working length sections 60 and in the interior and exterior end-turn sections 62, 64 (with the exception, as already described, of the height dimension at the intermeshing notches 40). The thickness of each ribbon conductor 42 also remains constant throughout the entire length of each conductor 42.

Figure 16:
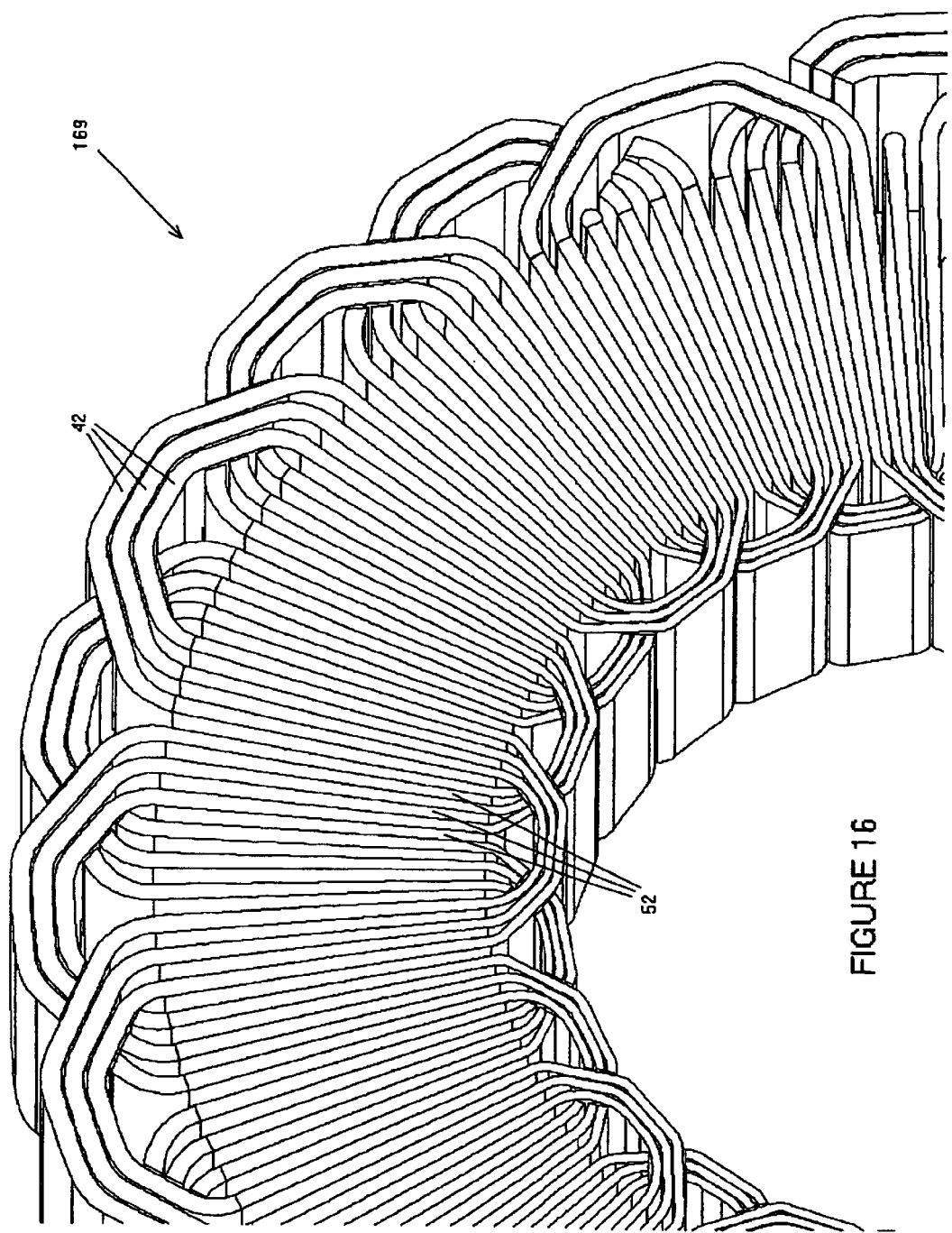
FIG. 16 is a broken away perspective view of a tapered thickness ribbon wave array, similar to that of FIG. 6, but wherein the thickness of each ribbon conductor increases as one proceeds radially outwardly from the interior end-turns to the exterior end-turns.

However, it is not always the case that the height and thickness of the conductor remains constant. FIG. 16 is a broken away, perspective view of a tapered ribbon wave array 169. In this case, the thickness of each ribbon conductor 42 increases as one proceeds radially outward from the interior end-turn lengths 62 to the exterior end-turn lengths 64. This tapering of the thickness of the conductors 42 allows an increase in the copper density of the winding array 169, and this results in a power advantage which is especially significant when the PMM is an ironless machine (that is, when there are no magnetic inserts in the gaps 52 between the conductors 42). This array 169 could be used in the place of the array used in the PMM of FIG. 1.

Figure 19:
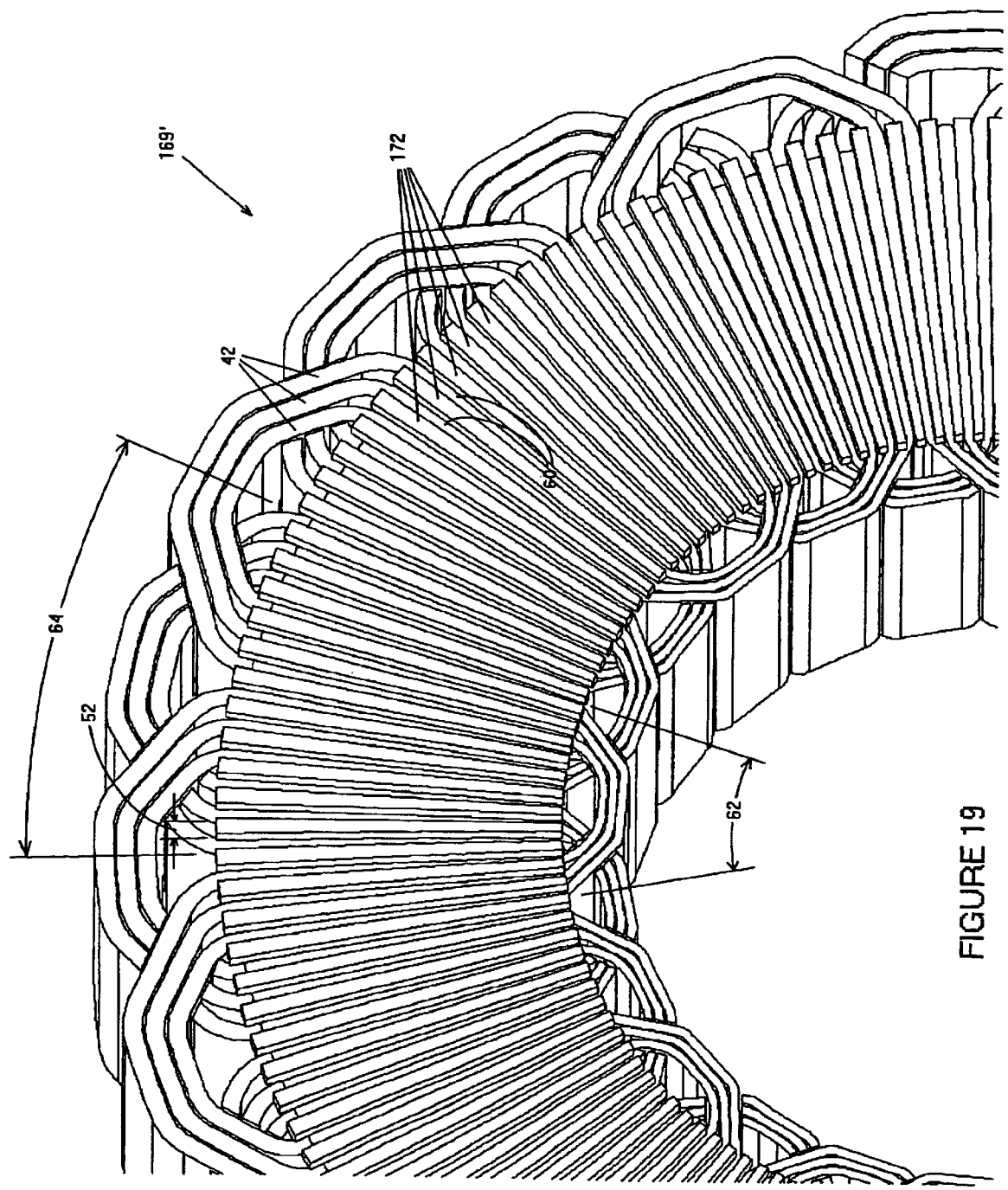
FIG. 19 is a broken away, perspective view of the tapered thickness ribbon wave array of FIG. 16 with iron inserts added.

FIG. 19 depicts a tapered ribbon wave array 169', which is the same as that in FIG. 16, but with magnetic inserts 172 inserted between the conductors 42 along their working length sections 60. The presence of these inserts 172, which are typically made of iron, serves to enhance the magnetic field along the working length section 60 and thus reduces the amount of permanent magnet material required. It is also worth noting that the use of tapered thickness ribbon conductors allows the magnetic inserts 172 to be optimally tapered for uniform magnetic saturation, higher flux, and lower losses.

Figure 19A:
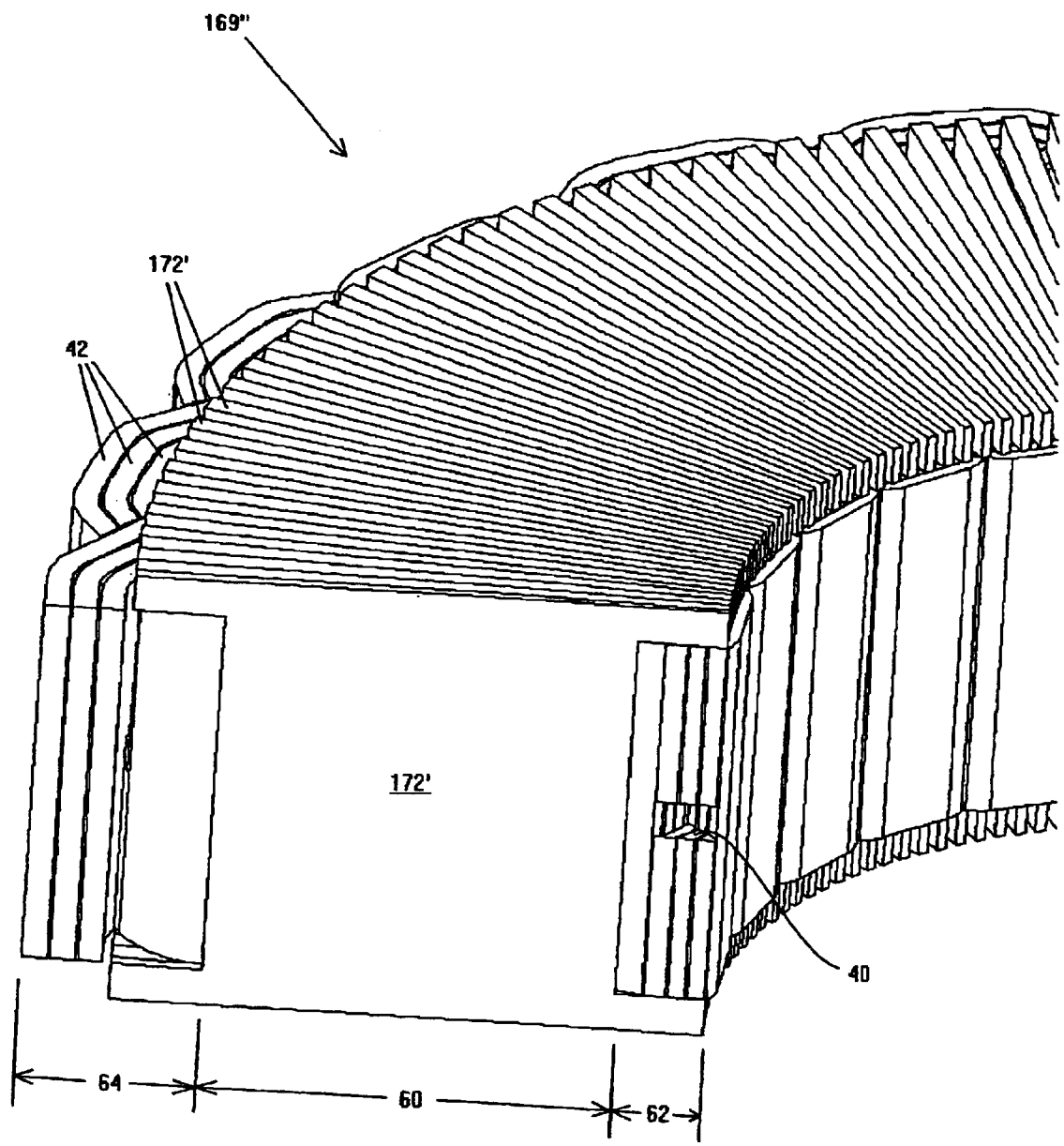
FIG. 19A is a perspective, sectional view (section lines omitted for clarity) of a ribbon wave array similar to that shown in FIG. 19, showing the iron inserts extending well into the transition lengths of the end-turns to increase the effective air gap surface area.

FIG. 19A is a sectional profile of constant height, variable thickness ribbon wave winding array 169" with iron inserts 172", very similar to the tapered ribbon wave array 169' except that the iron inserts 172" extend well into the transition lengths 68 of the inner and outer end-turns 62, 64 respectively. In this manner, the magnetic air gap surface area (S in the equation F=k*B*K*S discussed in the background of this applicaton) may be extended past the working length areas 60 and into the end-turn regions 62, 64, where the conductors 42 are transitioning from radial to tangential orientations, but still have a radial component that can contribute to torque production.

Another benefit of winding arrays made in accordance with this invention is best appreciated in FIG. 19. The gaps 52 between conductors 42 for placement of the iron inserts 172 are present in the working length areas 60, but those gaps 52 quickly narrow down to no gaps in the end-turn areas 62, 64. As a result the end-turn lengths are shorter and the notches 40 are narrower than they would otherwise be, resulting in lower electrical losses and a smaller, more compact machine; a higher power density machine.

Figure 17B:
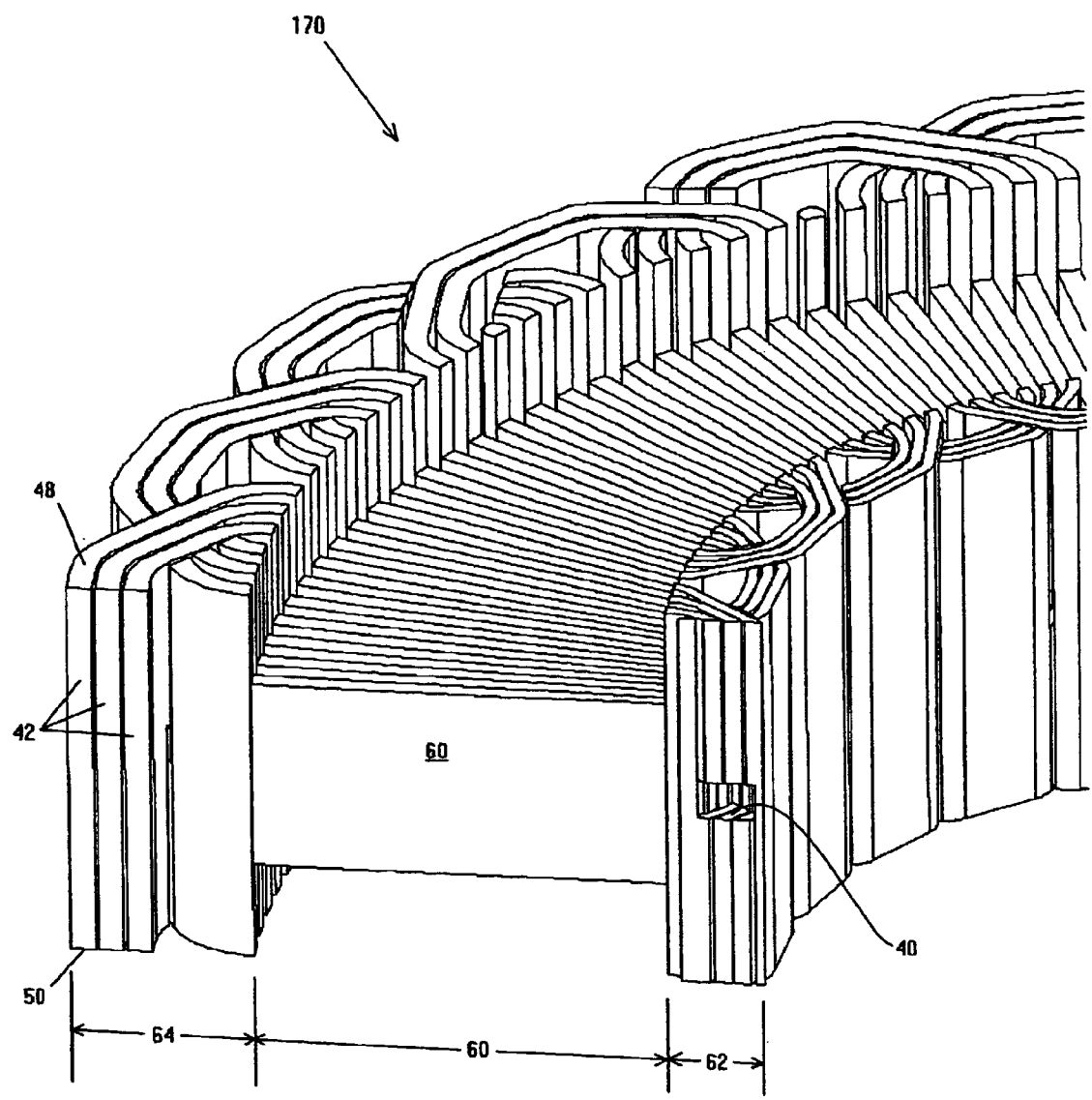
FIG. 17B is a perspective, sectional view of a tapered thickness ribbon wave array, similar to that of FIG. 17A, but with a variable height profile, wherein the working length of the conductor has a constant height dimension which is less than the height dimension of the interior and exterior end-turns.

FIG. 17B is a view similar to FIG. 17A, but for another embodiment. This winding array 170 is a tapered ribbon wave array with height profiling. In this instance, the height dimension of the conductors 42 along the working length sections 60 remains constant, but this height dimension is less than the height dimension of the conductors 42 at the end-turns 62, 64. In this embodiment, the height dimension of the conductors 42 at the exterior end-turn lengths 64 is constant (with the exception, as already described, of the height dimension at the intermeshing notches 40) such that housing portions (not shown) clamped to the forward and rear faces 48, 50 at the exterior end-turns 64 have good contact with all ribbon conductors 42 of all the phase windings of the array 170 for good conductive heat transfer between the conductors and the housings. The height profiling allows for a smaller height dimension at the working lengths 60 in order to take better advantage of the magnetic flux effects, while allowing a taller height dimension at the end-turn lengths 62, 64 in order to reduce the electrical resistance, especially at the intermeshing notches 40.

As may also be appreciated in FIG. 17B, the thickness of each ribbon conductor 42 increases as one proceeds radially outward from the interior end-turn lengths 62 to the exterior end-turn lengths 64. As discussed earlier with respect to winding arrays 169, 169', and 169", this tapering of the thickness of the conductors 42 allows an increase in the copper density of the winding array 170, and reduces non-uniform saturation in the iron inserts 172 (if present), resulting in a more powerful PMM.

Figure 18:
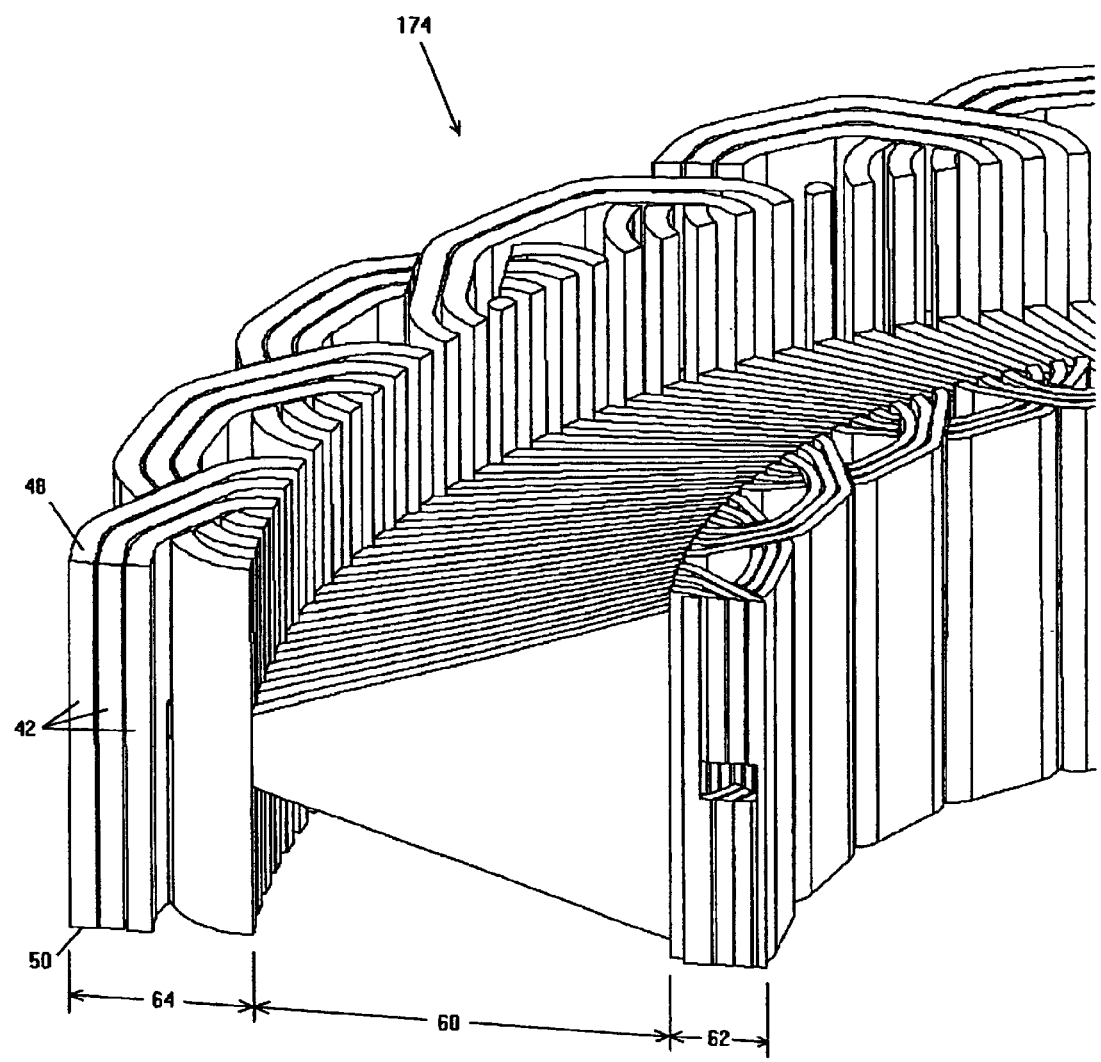
FIG. 18 is a perspective, sectional view of a tapered thickness ribbon wave array with variable height profile, similar to that of FIG. 17B, but with the working length area of the conductor having a tapered height.

FIG. 18 is a view similar to FIGS. 17A and 17B, but for another embodiment of a winding array 174 which corresponds to a tapered ribbon wave array with tapered height profiling. In this instance, the height dimension of the conductors 42 along the working length sections 60 tapers down as one proceeds along the working length 60 from the interior end-turn lengths 62 to the exterior end-turn lengths 64, to form a frustroconically-shaped profile of the conductors 42 along the working length sections 60. The height dimension of the conductors 42 at the exterior end-turn sections 64 is constant (with the exception of the height dimension at the intermeshing notches 40) such that flat flanges of the housing portions can be clamped to the forward and rear faces 48, 50 at the exterior end-turn lengths 64 and will have good contact with all ribbon conductors 42 of all the phase windings of the array 174 for good conductive heat transfer between the conductors and the housings. The tapered height along the working length sections 60 of the conductors 42 allows for an optimization of the magnetic gap effects weighed against thermal and electrical resistance losses, resulting in a more powerful PMM.

Figure 34:
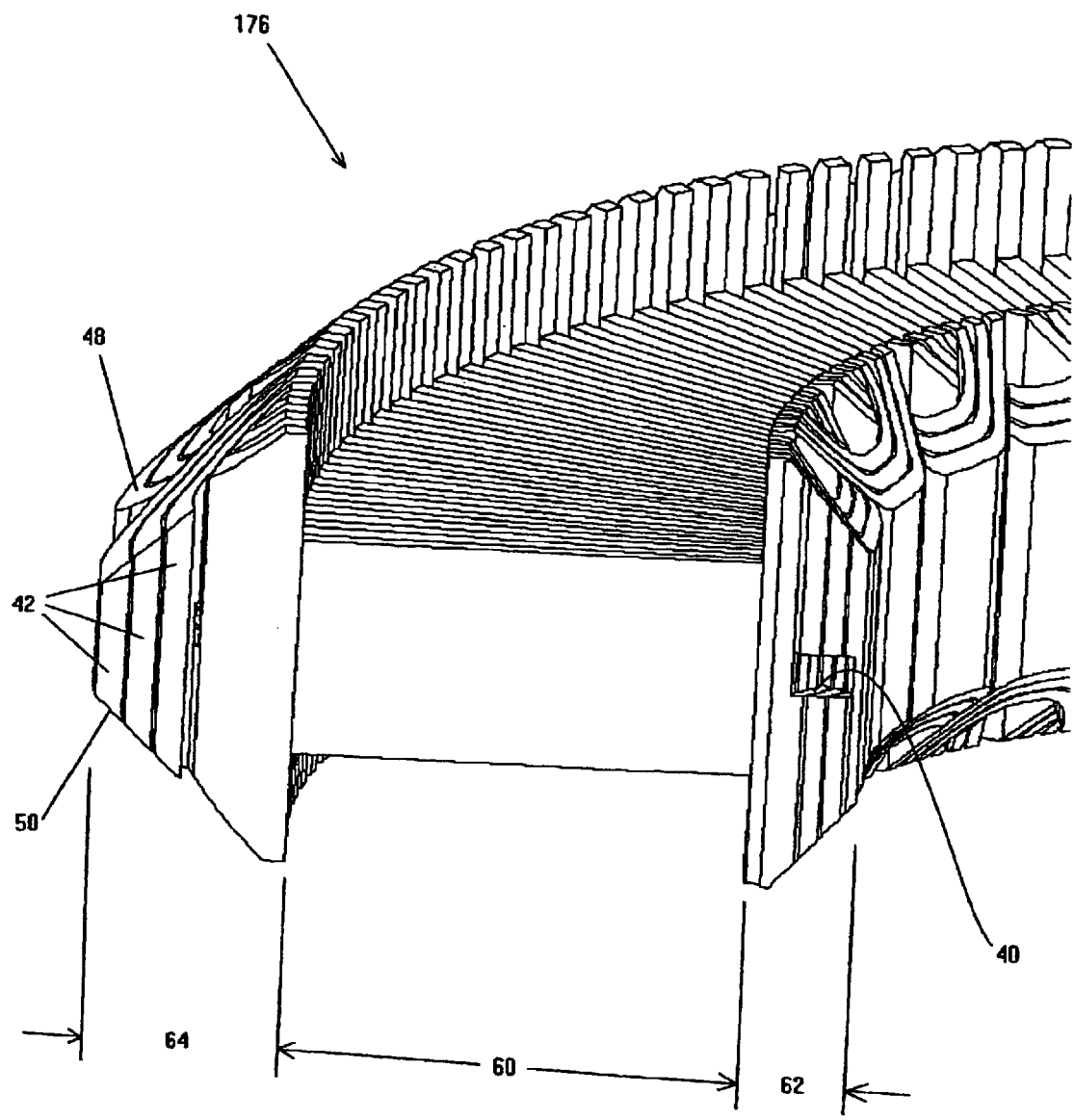
FIG. 34 is a perspective, sectional view of a tapered thickness ribbon wave array, similar to that of FIG. 17B, but wherein the end-turn length area of the conductor has a tapered height.

FIG. 34 is a view similar to FIG. 17B, but for another embodiment of a winding array 176 which corresponds to a tapered ribbon wave array with tapered height profiling in the end-turn lengths 62, 64. In this instance, the height dimension of the conductors 42 along the end-turn sections 62, 64 varies as one proceeds radially along the end-turn lengths 62, 64 away from the working length areas 60, to form frustroconically-shaped profiles of the conductors 42 along the end-turn lengths 62, 64. Similarly frustroconically-shaped flanges of the housing portions can be clamped to the: forward and rear faces 48, 50 at the exterior end-turn lengths 64 and will have good contact with all ribbon conductors 42 of all the phase windings of the array 176 for good conductive heat transfer between the conductors and the housings. For some applications, the profile of the end turn portions may differ from the described planar or frustroconical shapes described, as packaging needs dictate.

Figure 35:
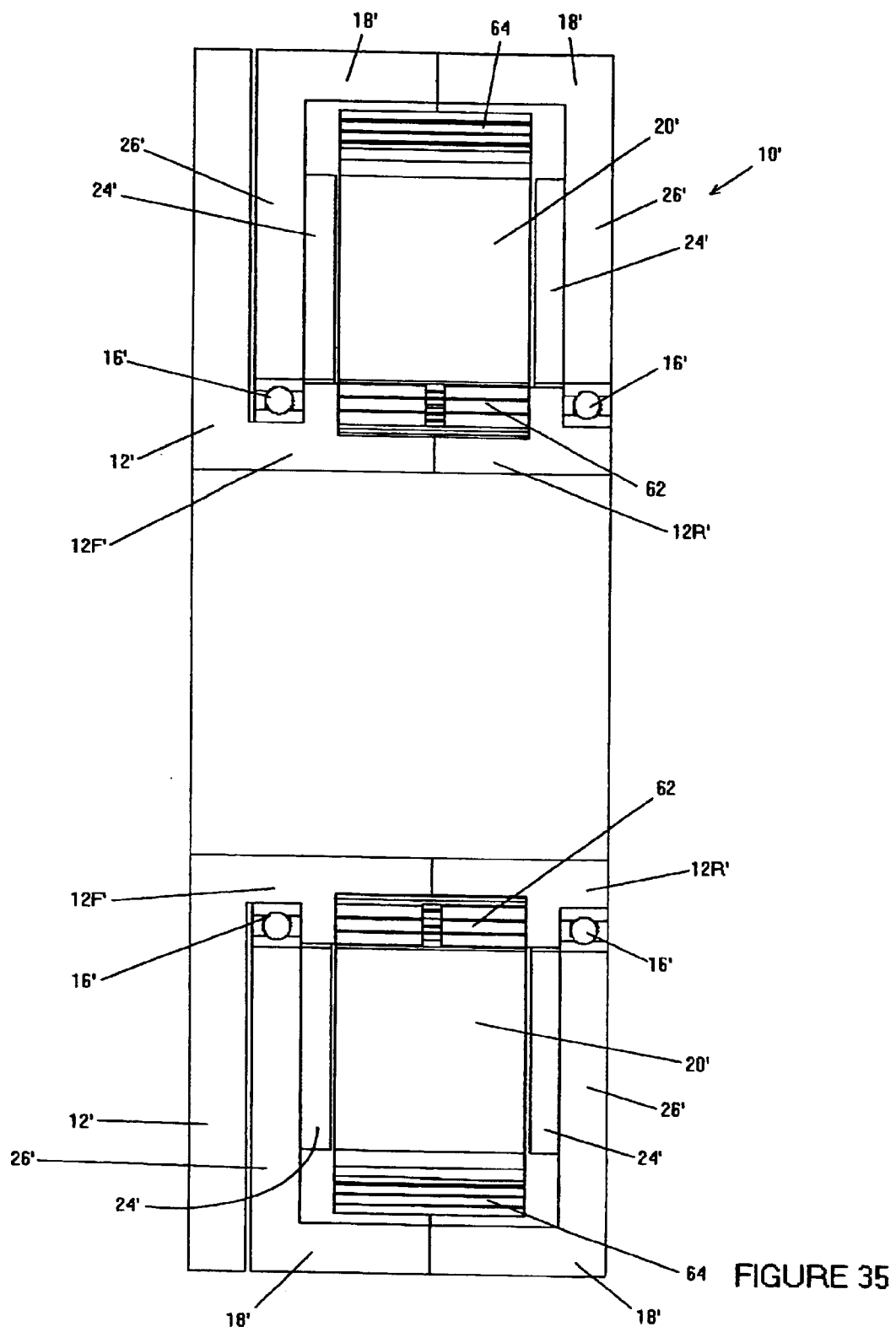
FIG. 35 is a cross-sectional view of an "inside-out" axial gap permanent magnet synchronous machine (PMM) made in accordance with the present invention wherein the stator coil is clamped at the inner end-turns, with section lines removed for simplicity.

FIG. 35 is a sectional view (cross-hatching not shown for clarity) of an embodiment of a PMM 10' made in accordance with the present invention. This PMM is referred to as an inside-out motor, and a typical application may be for use as a wheel motor where a rim or wheel is mounted to the rotors 18' and the housing 12' is secured to the suspension of the vehicle. The rotors 18' include magnets 24' and flux return disks 26' and are journaled on bearings 16' for rotation around the housing 12'. The stator 20' is clamped at the inner end-turns 62 to the front and rear housing portions 12F', 12R' respectively. Thus, this embodiment 10' is very similar to the PMM 10 of FIG. 1, except that the stator 20' is attached to the housing 12' via the inner end-turns 62 instead of via the outer end-turns 64 of the previously described embodiments. It will be obvious to those skilled in the art that all the winding arrays disclosed in this specification as being relevant to the type of PMM 10 depicted in FIG. 1 are also relevant to the type of PMM 10'' depicted in FIG. 35.

Figure 33:
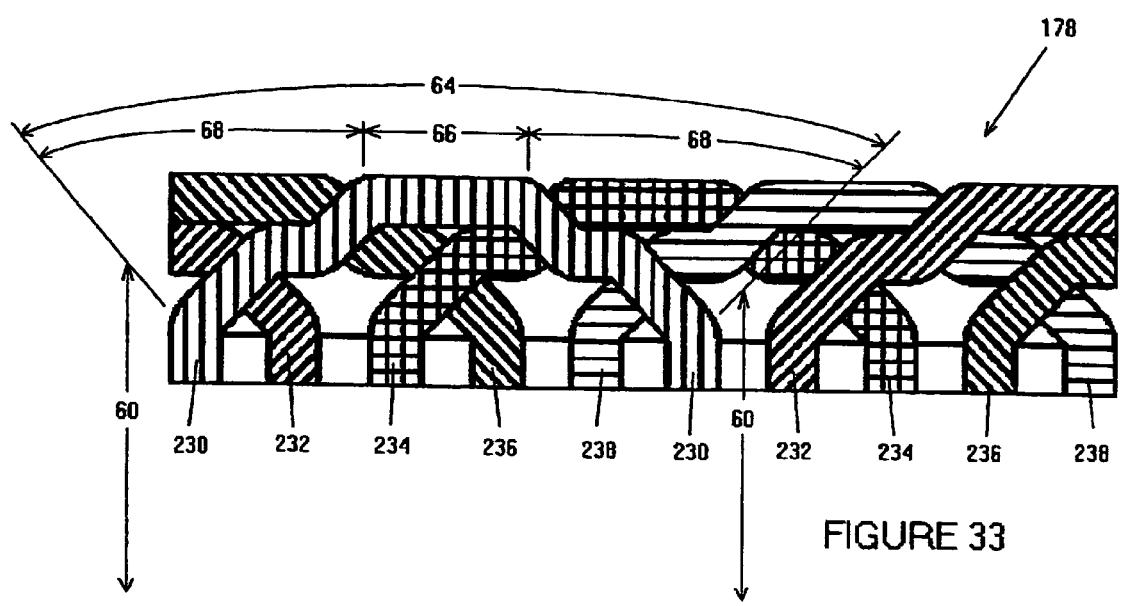
FIG. 33 is a schematic of an embodiment of the end-turn arrangement for a five-phase winding array made in accordance with the present invention.

FIG. 33 is a schematic representation of the outer end-turn arrangement for a five phase winding array 178 made in accordance with the present invention. The individual phases 230, 232, 234, 236, and 238 are shown with different cross-hatching patterns to be able to tell one from another. It may be noted that the outer end-turn arrangement for a five phase winding array 178 is quite similar to the end-turn arrangements for a three phase winding array 20 as shown in FIG. 20. In both cases, the end-turn lengths 64 include a bridging length 66, in which the conductors are tangentially oriented relative to the shaft 14 (or to the axis of rotation of the PMM), and flanked by two cross-over lengths 68 which connect the bridging length 66 to the working lengths 60. Each cross-over length 68 includes one or more intermesh lengths characterized by the presence of notches 40, wherein the individual conductors 42 of each phase cross the conductors 42 of the other phases at substantially right angles.

Description of Coil Type Winding Arrays

Figure 12:
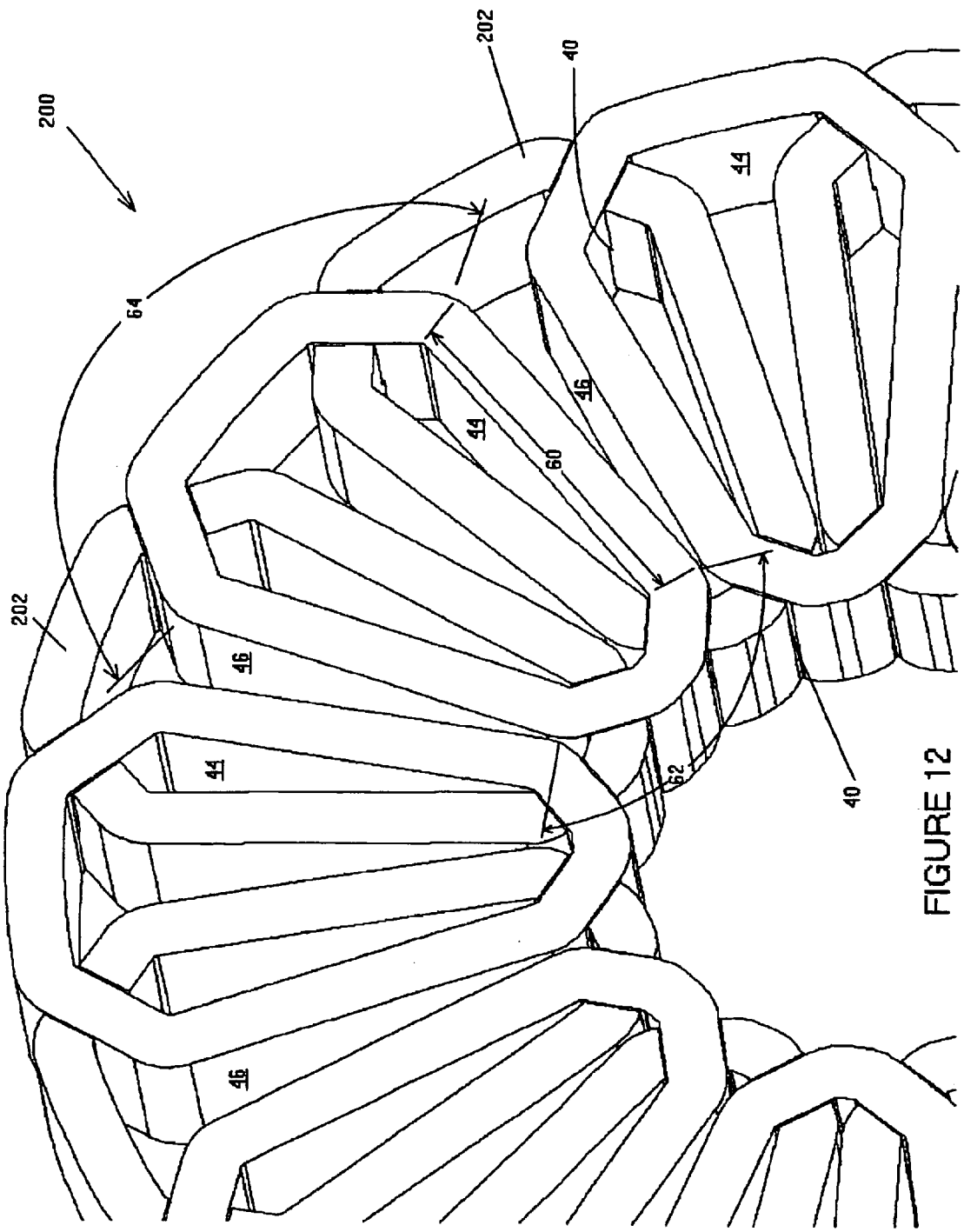
FIG. 12 is a broken away, perspective view of a ribbon coil array, which may be used instead of the wave array of FIG. 6, with each coil being represented as a solid piece for simplicity, and with the electrical connectors removed for simplicity.
Figure 14A:
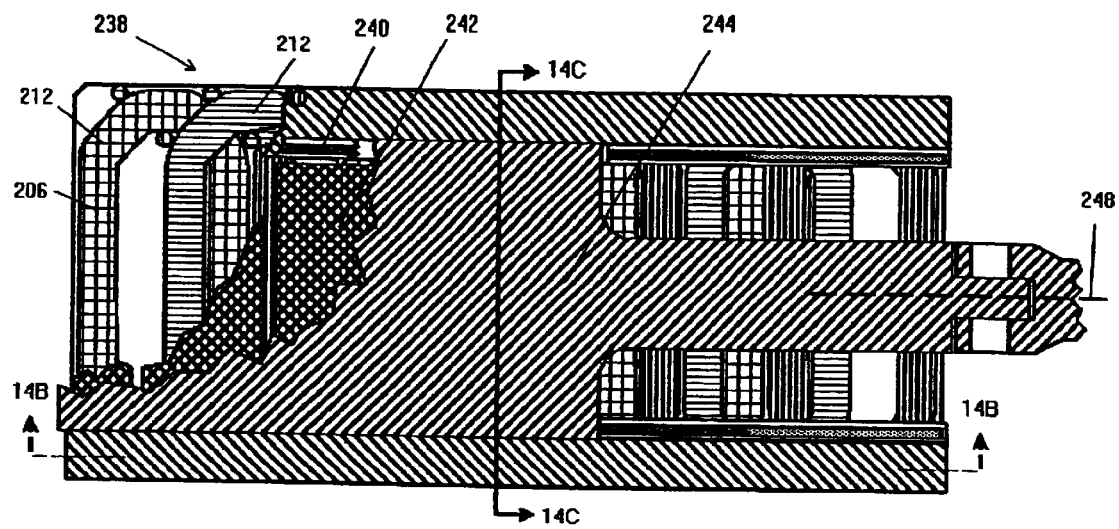
FIG. 14A is a partially broken-away top section view of a linear actuator made in accordance with the present invention, with the housing removed for clarity.

FIG. 12 depicts a ribbon coil array 200, and FIG. 13 is an exploded, perspective view of the same ribbon coil array 200 of FIG. 12. This coil array 20 could be used in the place of the wave winding array of FIG. 1. It includes a plurality of identical coils 202. Note that, for clarity, the individual conductors 42 which make up a coil 202 are not shown. However, it is understood that each coil 202 is made from a plurality of layers of individual, insulated ribbon conductors 42, similar to those depicted in FIGS. 4, 5, and 6. In fact, the coil array 200 is very similar to the wave array 30 depicted in FIGS. 4, 5, and 6, differing mostly in that the coils 202 are independent of each other, and are connected to other coils 202 in the same phase by electrical conductors 204 which have been omitted for clarity from FIGS. 12 and 13 but which are shown in FIG. 14, in an embodiment for a linear ribbon coil array 206 used in linear electrical devices such as the device 238 shown in FIG. 14A.

As seen in FIG. 13, each coil 202 has a forward face 208 and a rear face 210, with the distance between these faces 208, 210 defining a height dimension for each ribbon conductor 42. Even though, as indicated earlier, the individual conductors 42 are not shown in FIGS. 12–15, these conductors 42 have interior and exterior flat surfaces 44, 46 respectively, and the distance between these surfaces 44, 46 defines a width or thickness dimension for each ribbon conductor which is substantially less than its height dimension.

As was the case for the phase windings 34, 36, 38 described earlier, the coils 202 (See FIG. 12) have working length sections 60, interior end-turn sections 62, and exterior end-turn sections 64, with intermeshing notches 40 in the end-turn sections 62, 64. All the notches 40 in this embodiment are cut into the same face of the coil 202, and the coils 202 are simply flipped upside down as required to assemble the coil array 200 as seen in FIG. 12. The coils 202 intermesh at the intermeshing notches 40, resulting in a coil array 200 with a high degree of structural integrity. The structural integrity may be improved by several means, including dipping the assembly into a molten epoxy or polymer which binds the assembly together when cooled, or the array may otherwise be potted for strength.

As is readily evident, all the different configurations available in the ribbon wave array are available in the ribbon coil array, including the constant height and constant thickness configuration 30, 200 (FIGS. 6 and 12), the tapered thickness array 169 (FIG. 16), the tapered thickness with height profiling array 170 (FIG. 17B), the tapered thickness with tapered working area height profiling array 174 (FIG. 18), the tapered thickness with tapered end-turn areas height profiling array 176 (FIG. 34), and any or all of the above with magnetic inserts (such as array 169' of FIGS. 19 and 169" of FIG. 19A).

Figure 14B:
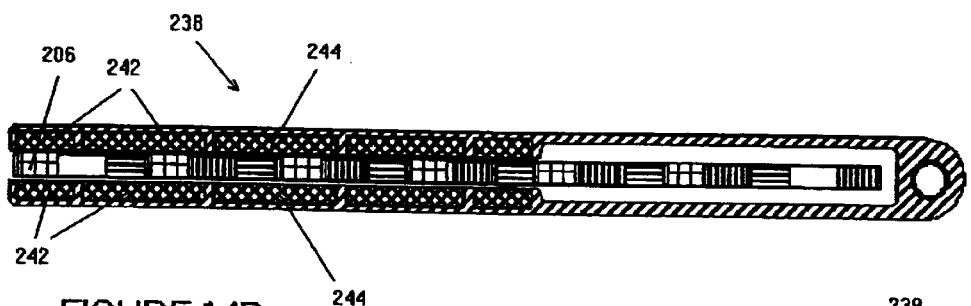
FIG. 14B is a sectional view along line 14B—14B of FIG. 14A.
Figure 14C:
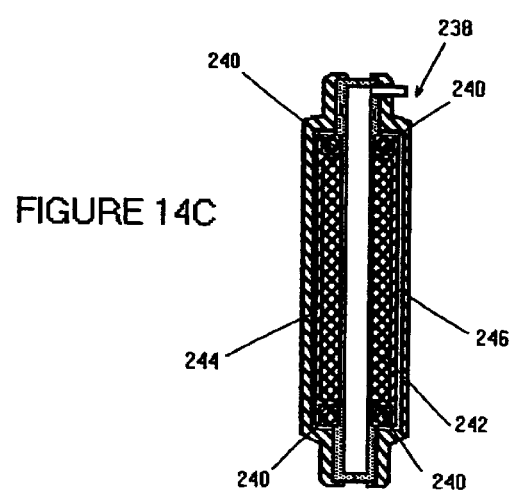
FIG. 14C is a sectional view along line 14C—14C of FIG. 14A.

FIG. 14A is a partially broken away top section view of a linear electrical device 238 made in accordance with the present invention (with the outer housing removed for clarity). FIG. 14B is a view along line 14B—14B of FIG. 14A, and FIG. 14C is a view along line 14C—14C of FIG. 14A but with the outer housing 246 included. The linear electrical device 238 includes a stator 206 (See FIG. 14) comprising a plurality of coils 212 with conductors 204 which electrically connect the coils 212 corresponding to a phase in the array 206, as described in more detail later. The linear electrical device 238 also includes bearings 240, magnets 242, flux return/magnet carrier 244, and housing 246 (See FIG. 14C).

Figure 15:
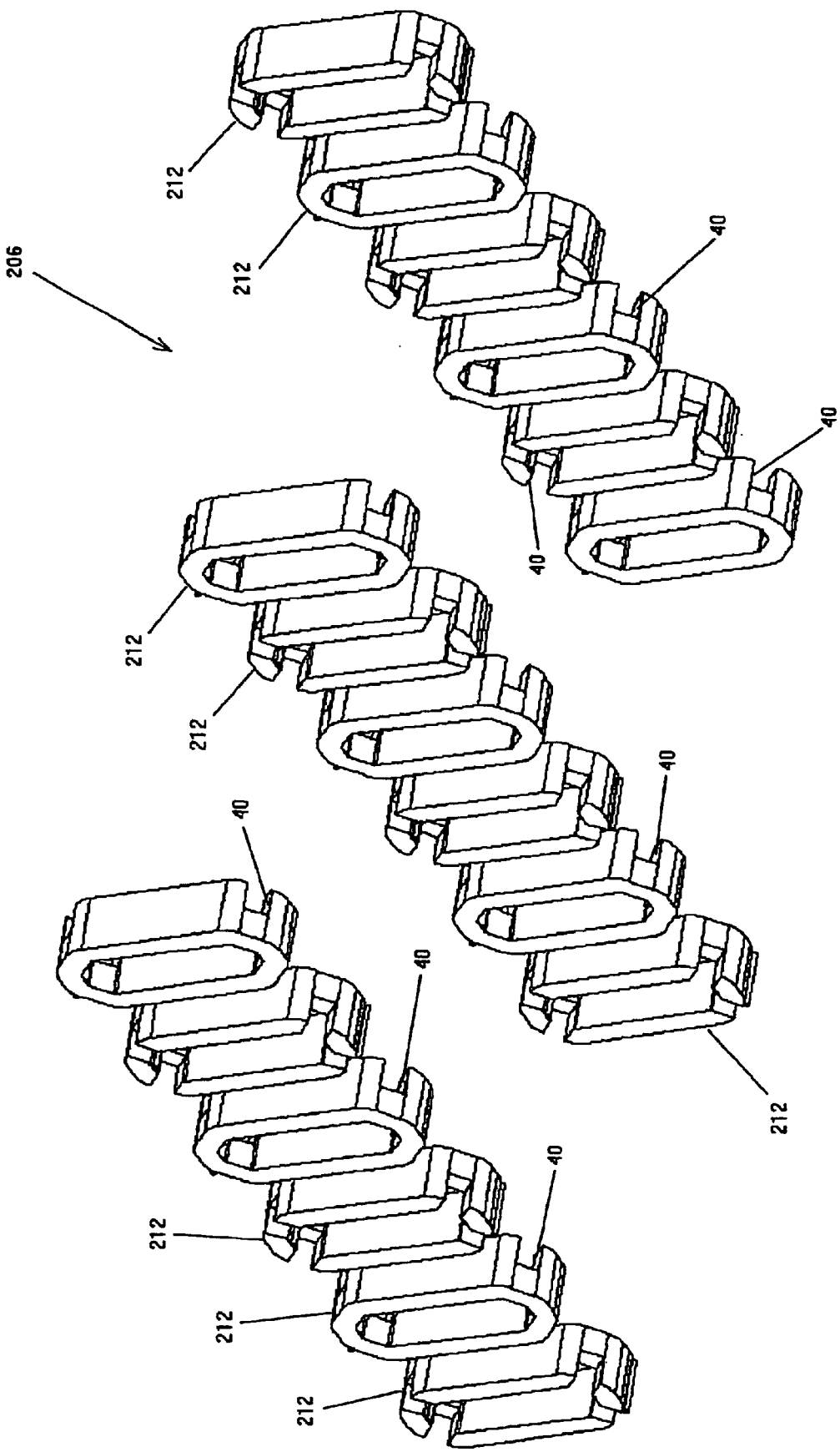
FIG. 15 is an exploded perspective view of the linear ribbon coil array of FIG. 14 without electrical connectors.

FIGS. 14 and 15 depict the stator or linear coil array 206, in which the individual conductors 42 have been omitted for clarity. This linear array 206 is comprised of oval-shaped coils 212 instead of the trapezoidal-shaped coils 202 of the coil array 200 of FIGS. 12 and 13. In this embodiment 206, the notches 40 are all cut into the same face of the coils 212, and the coils are simply flipped upside down as required for assembly of the linear coil array 206. However, alternatively, the locations of the notches 40 could be on alternate faces, similar to the way the notches 40 are on alternate faces in the wave winding 36 shown in FIG. 4. FIG. 14 also shows conductors 204, which electrically connect the coils 212 of each phase in the array 206.

Except for the fact that this is a linear array 206 for use in a linear PMM 238, the description, operation, configurations, and advantages discussed earlier with respect to wave arrays and coil arrays also apply to these linear arrays. The linear array 206 does not rotate about an axis of rotation as in the PMM of FIG. 1. Instead, it moves linearly, back and forth along a linear axis.

Description of Manufacturing Methods

FIGS. 21 through 25 are schematic views illustrating one method for manufacturing the ribbon wave windings 34, 36, 80 of FIG. 4. For clarity and simplicity, the method illustrates how to make a wave winding 214 (See FIG. 25) with only four "waves" (as compared to the eight "waves" in the windings 34, 36, 38 of FIG. 4). It is understood that a wave winding may have any number of "waves". It is also understood that a similar manufacturing method may be used, with obvious modifications due to the shapes involved, for the production of coil windings such as the coil windings 202 of FIG. 13, and the coil windings 212 of FIG. 15.

Figure 21:
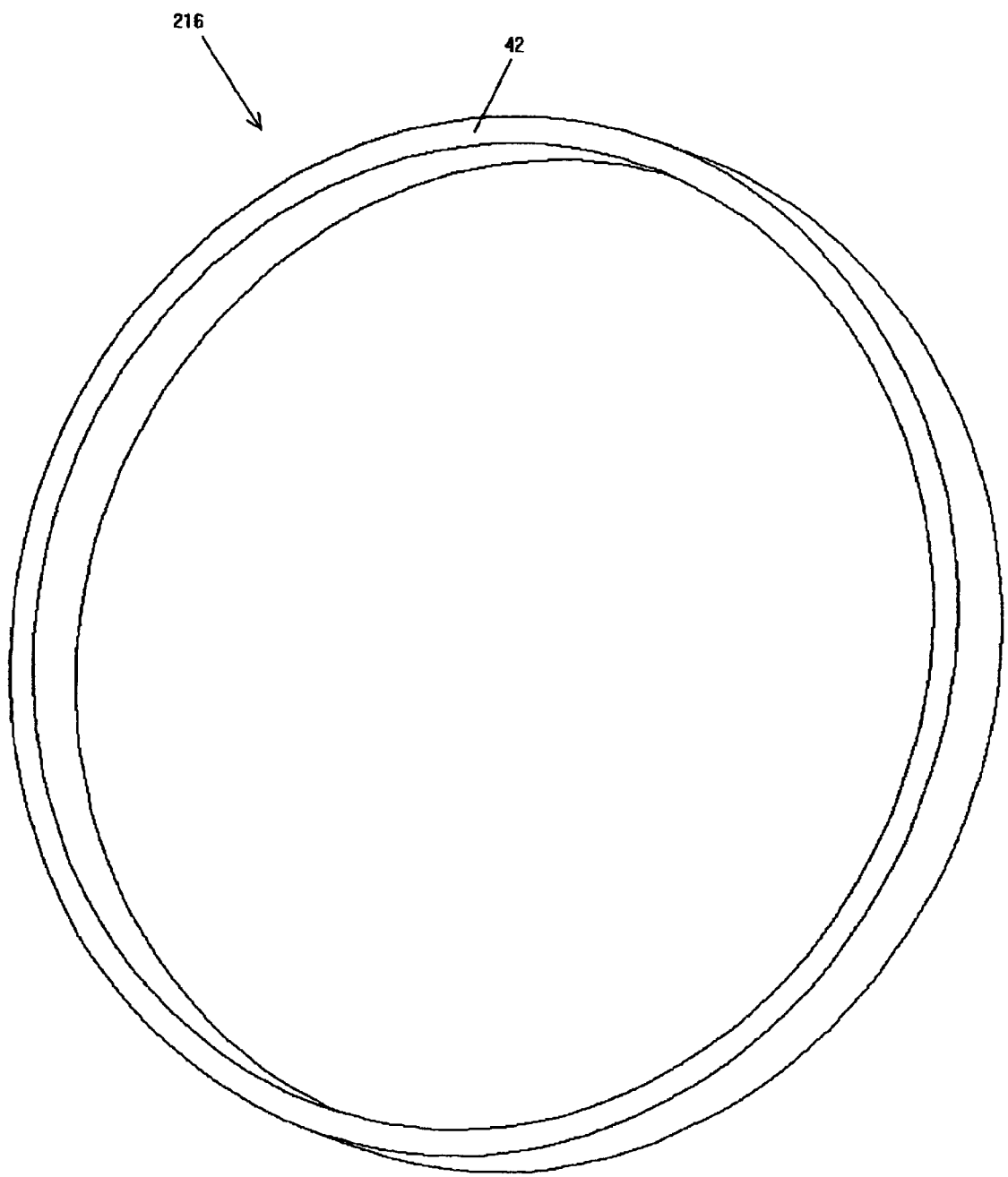
FIG. 21 is a schematic perspective view of a ring of wound ribbon conductor used in a first step in a manufacturing process in accordance with the present invention.

FIG. 21 depicts a cylindrically shaped coil 216 of ribbon conductor 42. The ribbon conductor 42 repeatedly has been wound onto itself to form several layers, like a roll of tape. The layers cannot be seen here, so schematically it appears as if there is just a single layer. The ribbon conductor 42 preferably has a solid metal inner core (typically copper) with an insulation jacket totally encasing the metal core. However, this is not always the case, as is explained in more detail later. The layers of the conductor 42 may be tightly nested against each other or they may have gaps between layers. These gaps, in combination with properly located spacers (not shown) to maintain these gaps where desired, will result in the gaps 52 (See FIG. 6) which may later be filled with magnetic inserts 172 such as those shown in FIG. 19.

Figure 22:
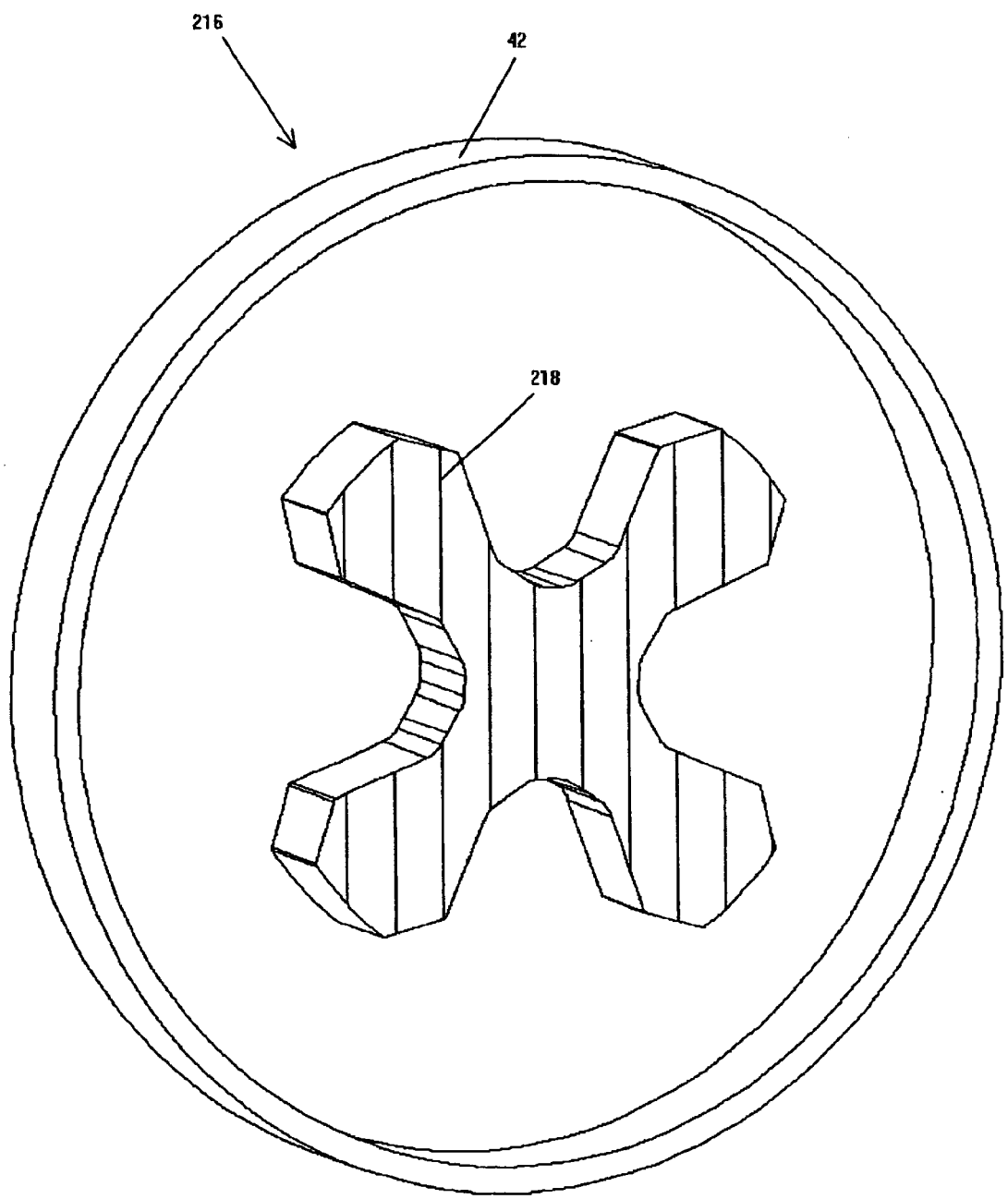
FIG. 22 is a schematic perspective view of the ring of FIG. 21 being placed around a mandrel in a second step in the manufacturing process.
Figure 23:
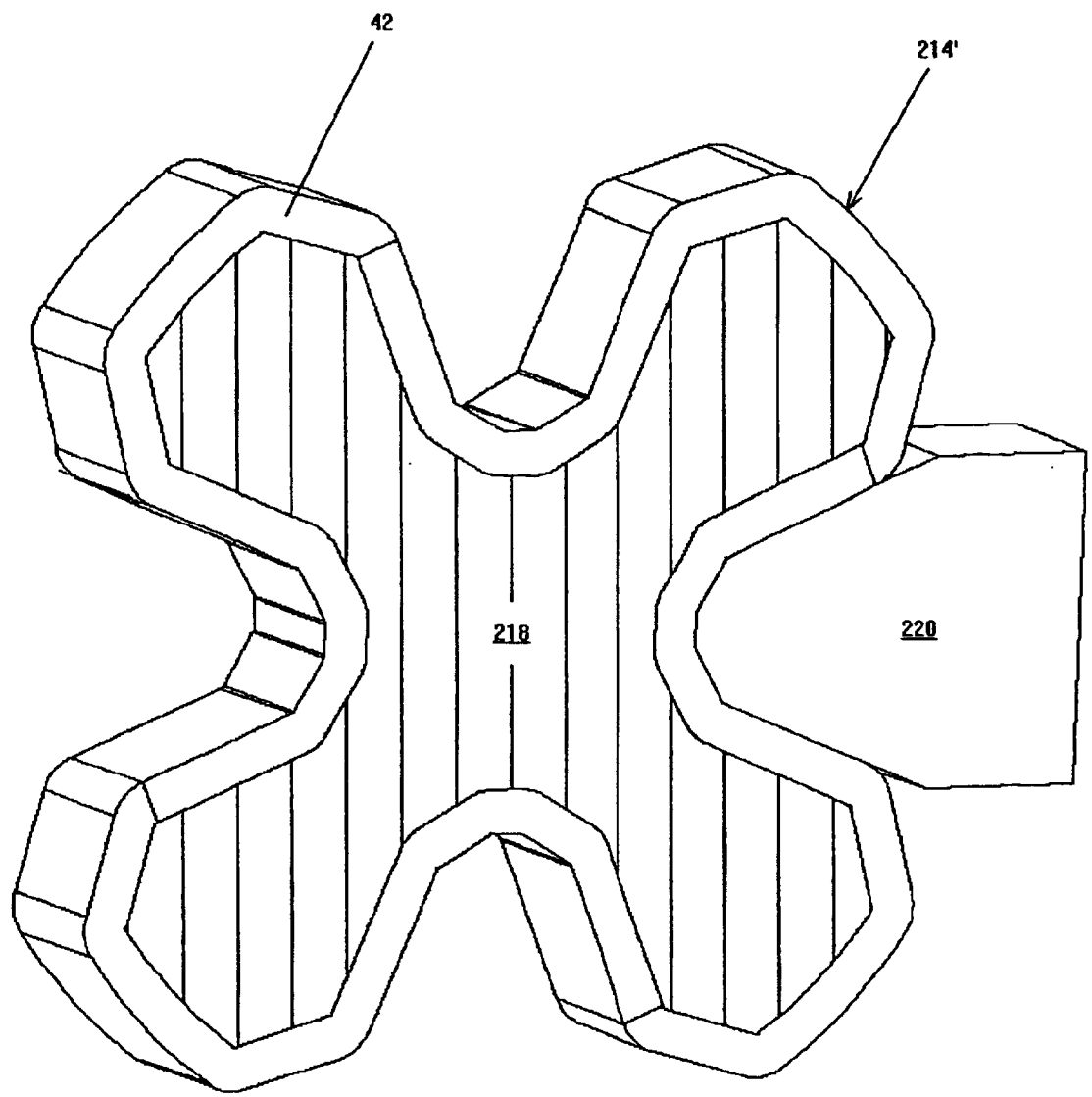
FIG. 23 is a perspective view of the ring of FIG. 21 now formed into the desired shape around the mandrel by using a forming die, shown in the final position of the last stamping.
Figure 24:
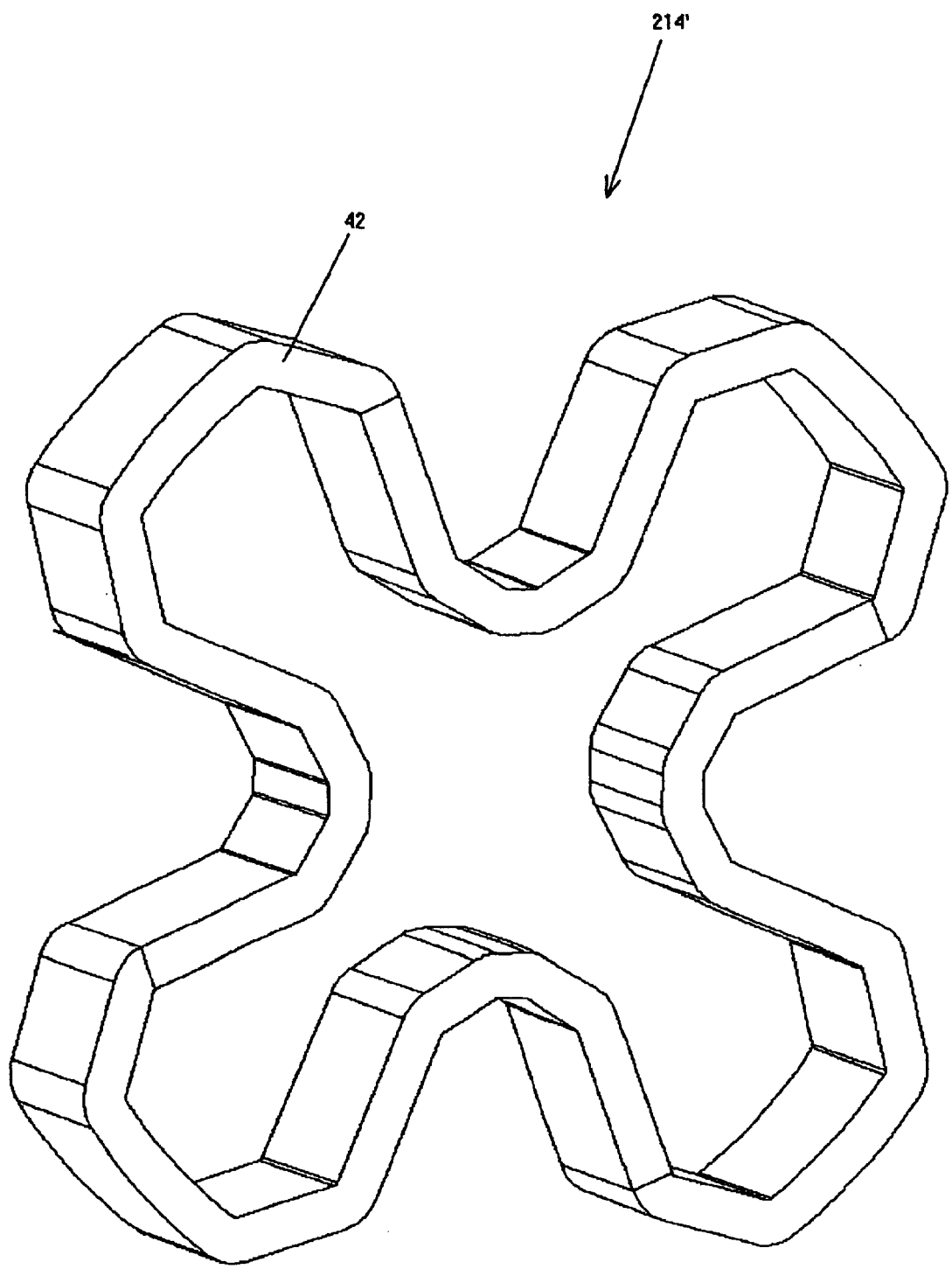
FIG. 24 is a perspective view of the newly formed phase winding of FIG. 23 prior to cuffing the intermeshing notches.
Figure 25:
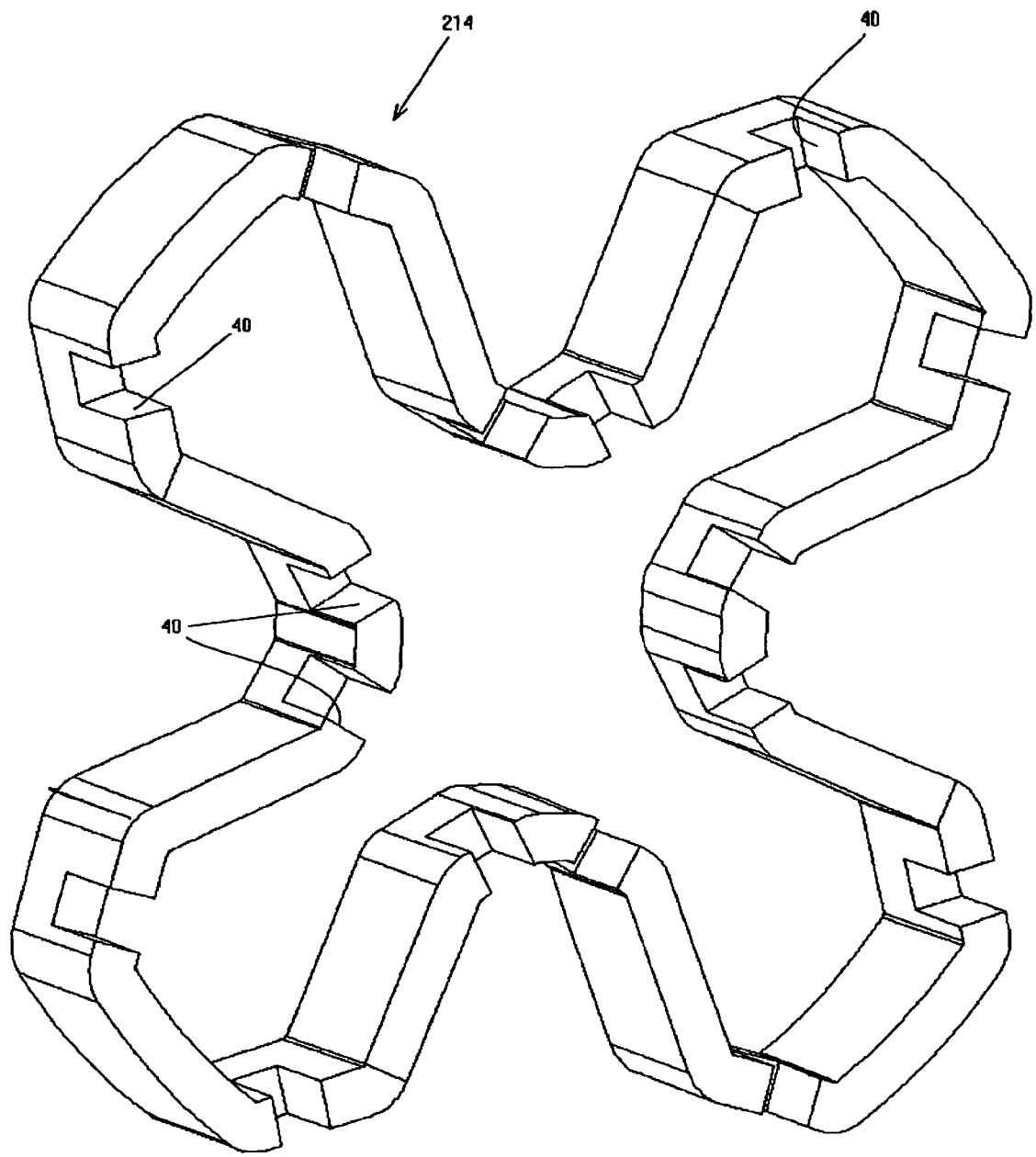
FIG. 25 is a perspective view of the newly formed phase winding of FIG. 24 after the intermeshing notches have been cut.

In FIG. 22, the coil 216 (of multiple layers of conductors 42) is centered outside of a mandrel 218 which has an outer profile shaped like the desired wave winding. As seen in FIG. 23, a die 220 is pressed against the coil 216 such that all the conductors 42 in the coil 216 adopt the profile of the mandrel 218, thus forming the wave winding 214'.

Next, notches 40 may be machined or otherwise cut or punched at the desired locations. This may be accomplished using a high speed end mill, wire EDM (electrodeposition machining), or possibly waterjet machining. If the final phase winding is to have height profiling (as in the array 170 of FIG. 17B) or tapered height profiling (as in the array 174 of FIG. 18), these and other such profiles may be cut into each phase winding at the same time that the notches 40 are added to the winding. Once the winding 214' has been cut, it is desirable to remove burs or smearing from the cut areas, if needed, to round any sharp edges. This may be accomplished chemically (or electrochemically) or mechanically. Any exposed metal areas may be cleaned and then insulated to prevent any turn-to-turn electrical shorts. The final product is then the phase winding 214, shown in FIG. 25.

Figure 26:
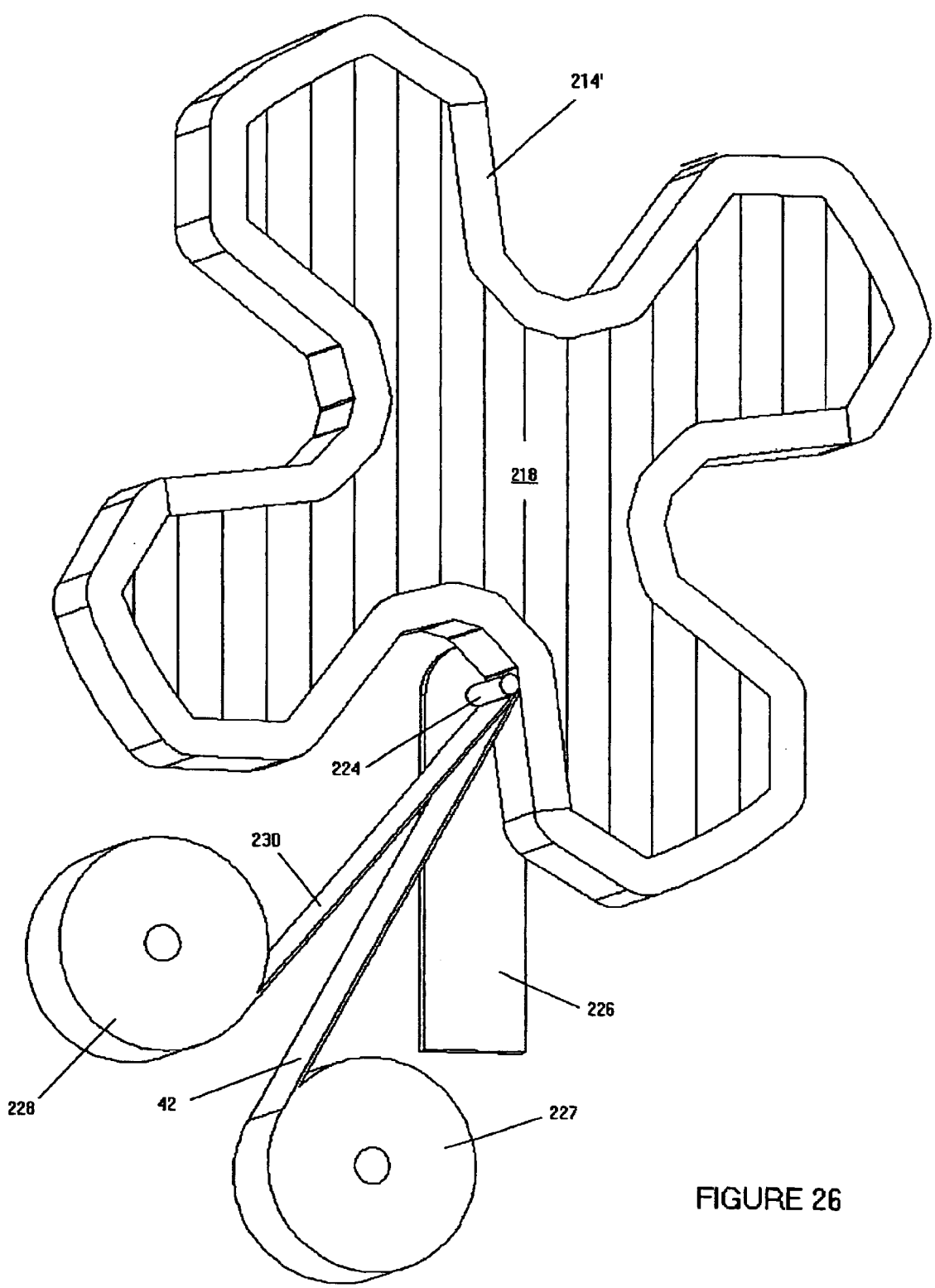
FIG. 26 is a perspective view of an alternate manufacturing process of forming a phase winding in accordance with the present invention.

This fabrication process is repeated until the desired number of windings 214 has been formed. The phase windings 214 are then assembled as shown in FIG. 4 (note that, for wave windings, at least one of the phase windings has the notches 40 on alternating phases as illustrated by phase winding 36 in FIG. 4). It is advisable to apply an additional insulation layer (not shown) at each notch 40 to guard against phase-to-phase electrical shorts. As indicated earlier, it may be desirable to improve the structural integrity of each individual phase winding 34, 36, 38, or even of the whole winding array 30 by "potting" the winding or array with a varnish, an epoxy, or some other dielectric material. Additional strength may be introduced by using materials to reinforce the winding array 30. Typically these are non-ferrous, non-conductive materials such as glass, ceramics, and/or polymers. FIG. 26 depicts an alternate fabrication method for a phase winding. In this method, the conductor ribbon 42 is dispensed directly from a spool 222 and is applied directly to the mandrel 218 by a roller 224 mounted on an arm 226, which is biased to keep the roller 224 against the profile of the mandrel 218. An optional roll of adhesive 228 could dispense a layer of adhesive 230 adjacent to the conductor ribbon 42 as it is being wound onto the mandrel, in order to add structural integrity to the phase winding 214'. Once the winding 214' is fabricated via this alternate method, the notches 40 may be cut, including deburring and insulation, as described earlier. The windings would then be assembled as already described.

Figure 27:
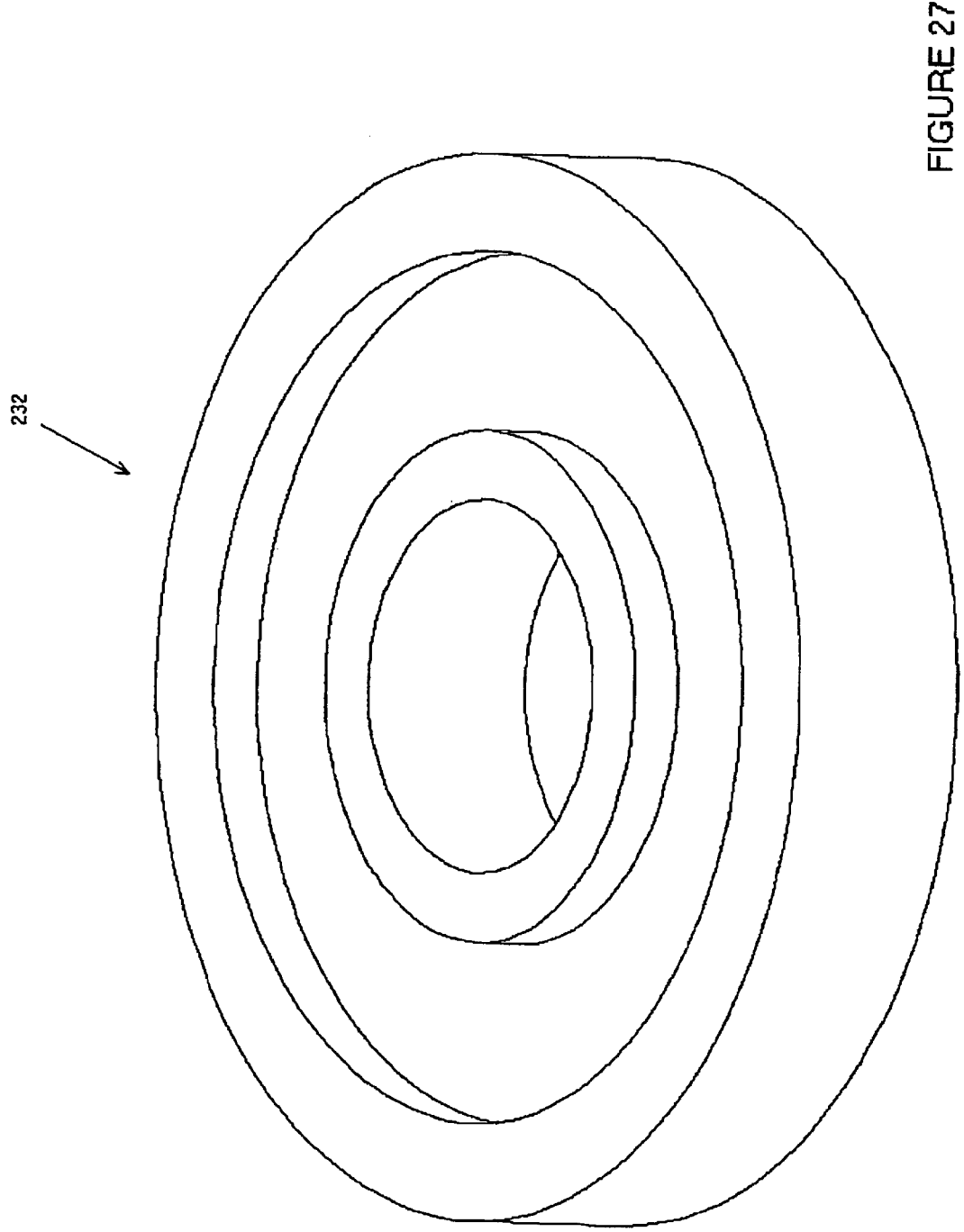
FIG. 27 is a perspective view of a copper blank used in another alternate manufacturing process in accordance with the present invention.

FIGS. 27–30 depict yet another fabrication method for a phase winding. FIG. 27 shows a billet 232, which is a copper "blank" in the required shape to produce the ribbon conductors of the desired width and height when cut. The billet 232 may be formed by machining, casting, forging, or other known methods. In this instance, the phase winding depicted during fabrication is one with height profiling as may be used in the array 170 of FIG. 17B, and the copper blank 232 has a cross-sectional profile which will yield the desired height profile when machined. It is readily appreciated that copper blanks with different cross-sectional profiles may be used to yield phase windings with the profiles required for different arrays, such as the constant height ribbon array 30 of FIG. 17A or the tapered height array 174 of FIG. 18.

Figure 28:
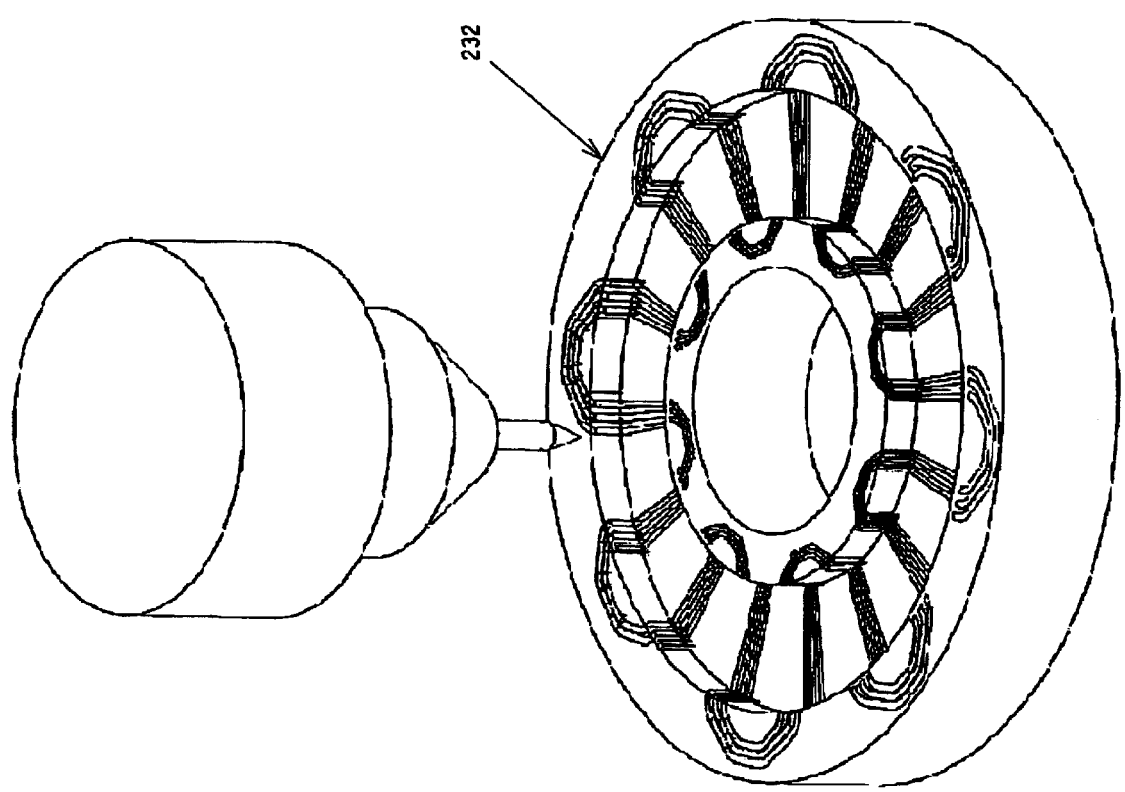
FIG. 28 is a schematic, perspective view of a machining process, machining the copper blank of FIG. 27.
Figure 29:
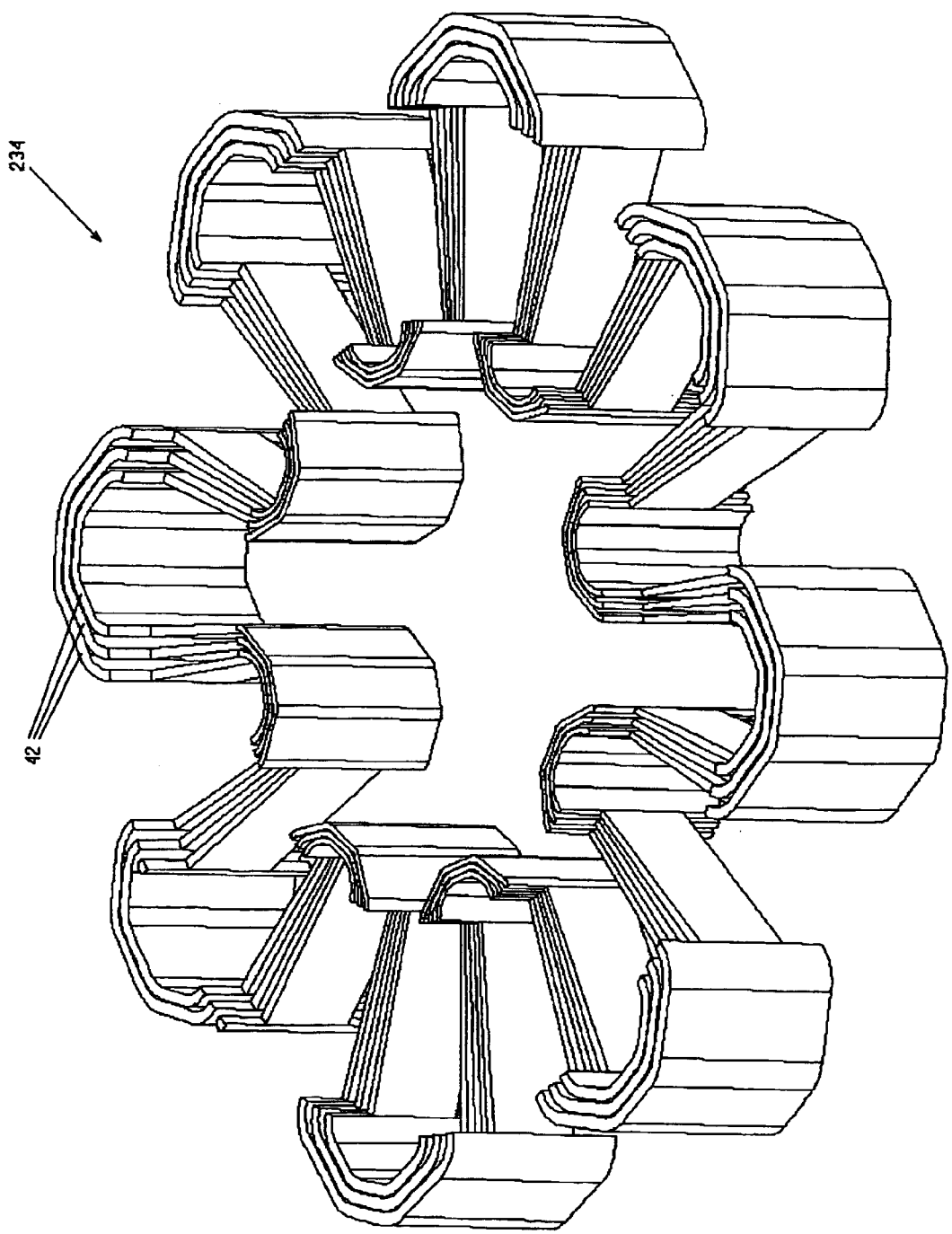
FIG. 29 is a perspective view of the newly formed phase winding of FIG. 28 prior to cutting the intermeshing notches.
Figure 30:
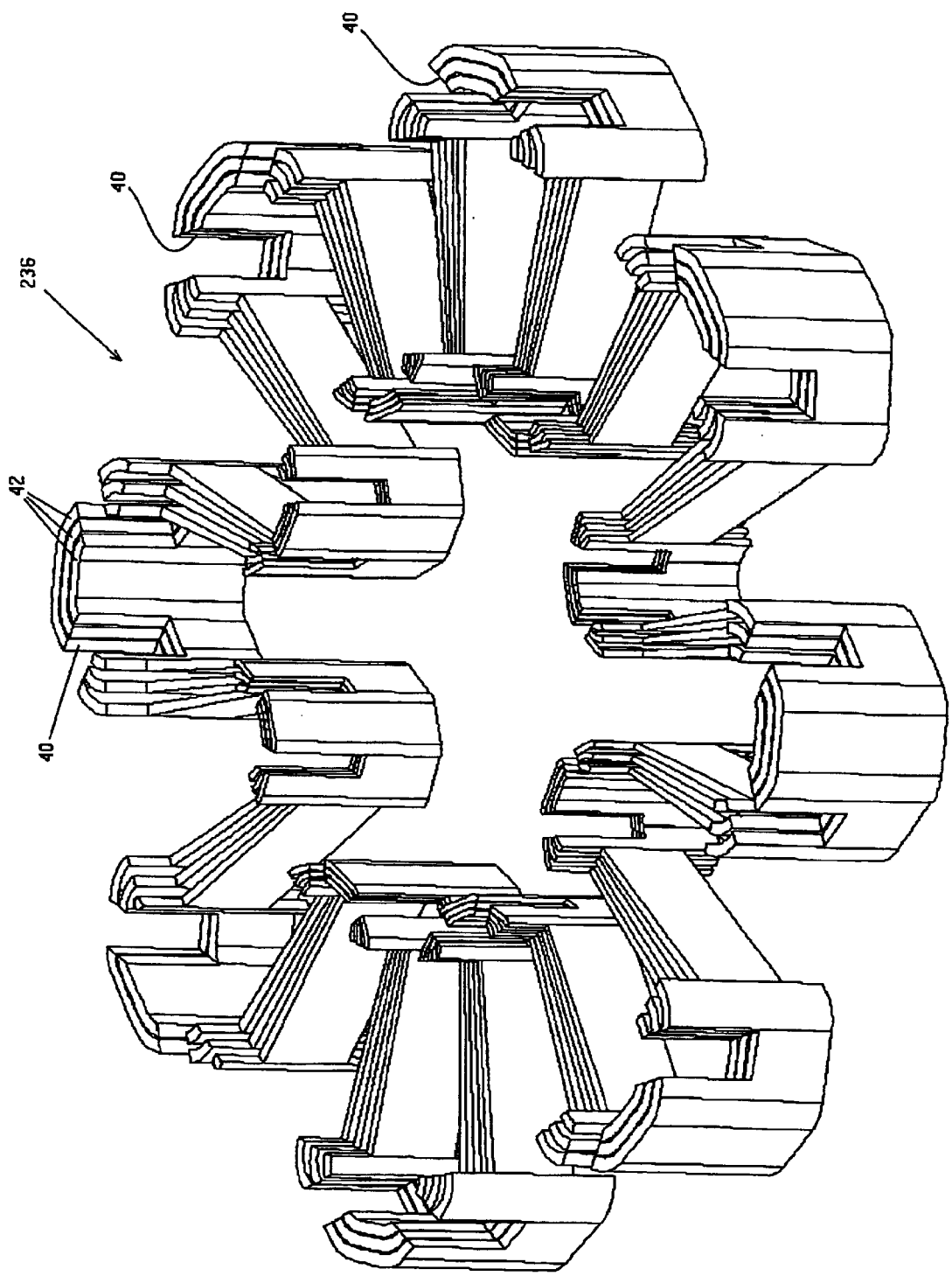
FIG. 30 is a perspective view of the newly formed phase winding of FIG. 29 after the intermeshing notches have been cut.

FIG. 28 schematically depicts the machining process, using a "thin kerf" cutting technology such as waterjet or wire EDM or laser cutting, to cut the ribbon wave windings. This manufacturing process also facilitates the production of a thickness tapered winding array such as the array 169 of FIG. 16 where the thickness of the conductors 42 increases as one travels radially out from the interior end-turns to the exterior end-turns. FIG. 29 shows the phase winding 234 produced via this manufacturing process. Once the winding 234 is fabricated via this alternate method, the notches 40 may be cut (See FIG. 30), including deburring and insulation, and the windings may be assembled as already described.

It should be noted that the machining of the copper blank 232 using thin kerf technologies may be complicated, as the individual conductors 42 produced may have a tendency to deform or warp due to residual metal stresses in the blank 232 and due to the heat applied during the machining process. One way to minimize these adverse effects is to start with a solid billet with a constant cross-sectional profile and which has been fully annealed for stress relief. The windings are then machined using thin kerf technology. The phase winding is then potted to add structural integrity and stability prior to further machining to the desired height profile and cutting of the notches 40. After final deburring and insulating of machined surfaces, the individual phase windings 234 may be assembled into the final winding array.

While the embodiments described above show a number of wave and coil arrays in a number of configurations, various other configurations could be used in axial gap, radial gap, and linear machines. It will be obvious to those skilled in the art that modifications may be made to the embodiments described above without departing from the scope of the present invention.

What is claimed is:

1. A method for making a multiple phase winding for an electromotive device, comprising the steps of:
   winding a first ribbon conductor having a first height around a mandrel to form a first multi-layered flat loop having the same height as the first ribbon conductor;
   winding a second ribbon conductor around a mandrel to form a second multi-layered flat loop having the same height as the first ribbon conductor;
   cutting notches in said first and second loops;
   insulating said notches; and
   crossing said loops at their respective notches to form a multiple phase winding having the same height as the first ribbon conductor.

2. A method for making a multiple phase winding for an electromotive device as recited in claim 1, and further comprising the step of deforming said first and second loops into a wave shape.

3. A method for making a multiple phase winding for an electromotive device, comprising the steps of:

forming a solid cylindrical blank of a conductor material;

cutting individual conductor turns from said blank, of the required thickness to produce the number of turns desired in a first phase winding;

cutting at least one notch in said first phase winding;

applying an electrical insulation coating over said first phase winding;

forming a second phase winding by repeating the above steps; and assembling said first and second phase windings with their respective notches intermeshing.

4. A method for making a multiple phase winding for an electromotive device as recited in claim 3, wherein said blank has the general shape and cross-sectional profile of the final phase winding.

5. A method for making a multiple phase winding for an electromotive device as recited in claim 3, and further comprising the steps of deburring and cleaning said winding prior to applying the electrical insulation coating.

6. A method for making a multiple phase winding for an electromotive device as recited in claim 5, and further comprising the step of potting said phase winding after cutting the individual conductor turns.

* * * * *